United States Patent
Yoon et al.

(10) Patent No.: US 10,420,060 B2
(45) Date of Patent: *Sep. 17, 2019

(54) METHOD AND APPARATUS FOR TRANSMITTING/RECEIVING POSITIONING REFERENCE SIGNAL IN WIRELESS COMMUNICATION SYSTEM

(71) Applicant: Innovative Technology Lab Co., Ltd., Seoul (KR)

(72) Inventors: Sung Jun Yoon, Seoul (KR); Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/039,753

(22) Filed: Jul. 19, 2018

(65) Prior Publication Data

US 2019/0045479 A1     Feb. 7, 2019

Related U.S. Application Data

(63) Continuation of application No. 15/673,933, filed on Aug. 10, 2017, now Pat. No. 10,045,325.

(30) Foreign Application Priority Data

Aug. 12, 2016  (KR) .................. 10-2016-0102825
Aug. 12, 2016  (KR) .................. 10-2016-0103209

(Continued)

(51) Int. Cl.
*H04L 1/16*     (2006.01)
*H04L 1/18*     (2006.01)
(Continued)

(52) U.S. Cl.
CPC .......... *H04W 64/003* (2013.01); *H04L 5/005* (2013.01); *H04L 5/0048* (2013.01);
(Continued)

(58) Field of Classification Search
CPC .................. H04L 5/0048; H04L 1/1812; H04L 27/2613; H04L 5/005; H04L 5/0007;
(Continued)

(56) References Cited

U.S. PATENT DOCUMENTS

2010/0273506 A1    10/2010    Stern-Berkowitz et al.
2012/0015667 A1    1/2012     Woo et al.
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 13)," 3GPP TS 36.211 V13.2.0, Jun. 2016, pp. 1-170, 3GPP.

(Continued)

*Primary Examiner* — Margaret G Mastrodonato

(57) ABSTRACT

An apparatus and method of processing a positioning reference signal are disclosed. In some embodiments, the method includes determining a narrow-band (NB) positioning reference signal (PRS) bitmap indicating a pattern selecting NB PRS subframes, wherein each NB PRS subframe comprises an NB PRS for positioning an NB user equipment (UE), transmitting, to the NB UE, NB PRS configuration information for the NB UE, the NB PRS configuration information comprising the NB PRS bitmap, determining, by a reference cell and based on the NB PRS bitmap, NB PRS subframes of the reference cell, mapping, by the reference cell, a first NB PRS in the NB PRS subframes of the reference cell, and receiving, from the NB UE and in response to the first NB PRS, a reference signal time difference (RSTD) measurement.

18 Claims, 24 Drawing Sheets

(30) Foreign Application Priority Data

Sep. 30, 2016 (KR) .................. 10-2016-0126856
Nov. 4, 2016 (KR) .................. 10-2016-0146920

(51) Int. Cl.
  *H04L 5/00* (2006.01)
  *H04W 4/02* (2018.01)
  *H04W 64/00* (2009.01)

(52) U.S. Cl.
  CPC ............. *H04L 5/0053* (2013.01); *H04W 4/02* (2013.01); *H04L 1/1607* (2013.01); *H04L 1/1812* (2013.01)

(58) Field of Classification Search
  CPC .. H04L 27/2655; H04L 5/0053; H04W 64/00; H04W 24/10; H04W 4/02; H04W 64/003; H04W 72/005; H04W 72/0446
  See application file for complete search history.

(56) References Cited

U.S. PATENT DOCUMENTS

| | | |
|---|---|---|
| 2014/0092761 A1 | 4/2014 | Behravan et al. |
| 2016/0234707 A1 | 8/2016 | Kazmi et al. |
| 2016/0295374 A1 | 10/2016 | Persson et al. |
| 2017/0111880 A1 | 4/2017 | Park et al. |
| 2017/0238298 A1 | 8/2017 | Wang et al. |
| 2017/0289831 A1 | 10/2017 | Park et al. |
| 2017/0332192 A1 | 11/2017 | Edge |
| 2018/0054792 A1 | 2/2018 | Lee et al. |

OTHER PUBLICATIONS

"3rd Generation Partnership Project; Technical Specification Group Radio Access Network; Evolved Universal Terrestrial Radio Access (E-UTRA); LTE Positioning Protocol (LPP) (Release 13)," 3GPP TS 36.355 V13.1.0, Mar. 2016, pp. 1-141, 3GPP.

Standalone Mode

Guard-band Mode

In-band Mode

METHOD AND APPARATUS FOR TRANSMITTING/RECEIVING POSITIONING REFERENCE SIGNAL IN WIRELESS COMMUNICATION SYSTEM

CROSS-REFERENCE TO RELATED APPLICATIONS

This application is a continuation of a U.S. patent application Ser. No. 15/673,933, filed on Aug. 10, 2017, which claims priority from and the benefit of Korean Patent Application Nos. 10-2016-0102825, filed on Aug. 12, 2016, 10-2016-0103209, filed on Aug. 12, 2016, 10-2016-0126856, filed on Sep. 30, 2016, and 10-2016-0146920, filed on Nov. 4, 2016, which are hereby incorporated by reference in their entirety.

BACKGROUND

1. Field

The present disclosure relates to a wireless communication system, and more particularly, to a method and apparatus for transmitting or receiving a narrow band positioning reference signal.

2. Discussion of the Background

The Narrowband Internet of Things (NB-IoT) concept has been proposed for the purpose of radio access to the cellular IoT based on a non-backward-compatible variant of Evolved-Universal Terrestrial Radio Access (E-UTRA).

The NB-IoT may improve indoor coverage and support a large number of low throughput devices, and may also enable lower delay sensitivity, significantly decreased device cost, reduced device power consumption, and an optimized network architecture.

The NB-IoT uses a very narrow band, such as a bandwidth corresponding to a single Resource Block (RB), or the like, and thus, physical channels, signals, and the like which have been utilized in E-UTRA (e.g., legacy Long Term Evolution (LTE)) may need to be newly designed. There is a need for a method of performing positioning by configuring a resource for a Positioning Reference Signal (PRS) to be appropriate for a narrow bandwidth, and mapping the sequence of a PRS to the allocated resource.

NB-IoT performs communication only in a Physical Resource Block (PRB) limited in the frequency axis (e.g., a single PRB); thus a larger number of subframes need to be used to transmit a PRS to secure positioning performance. However, a detailed method of configuring a time resource (e.g., a subframe) in which an NB-IoT PRS is transmitted has not yet been determined.

SUMMARY

A method and apparatus for configuring a Positioning Reference Signal (PRS) for a wireless communication system supporting an NB-IoT environment will be described with various example embodiments. One or more examples describe a method and apparatus for supporting PRS configuration in a new form using the time-frequency resources configurable in an NB-IoT environment, a subframe configuration for mapping the PRS, resource allocation in a subframe, a sequence configuration, and the like.

One or more examples describe a method and apparatus for supporting subframe configuration for mapping the PRS in an NB-IoT environment.

One or more examples describe a method and apparatus for supporting resource allocation in a subframe for NB-IoT environment.

One or more examples describe a method and apparatus for supporting a sequence configuration in the NB-IoT system.

According to one or more example embodiments, a positioning reference signal may be efficiently configured which is less affected by interference in the NB-IoT environment and is capable of securing excellent positioning performance.

DETAILED DESCRIPTION OF THE ILLUSTRATED EMBODIMENTS

Figure 1:
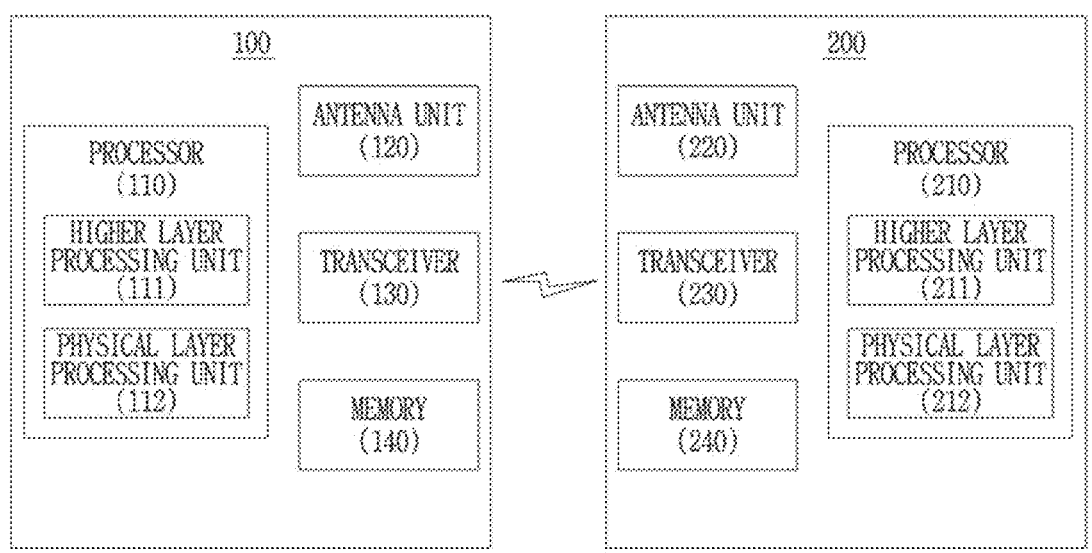
FIG. 1 is a diagram illustrating the configuration of a wireless device.

Exemplary embodiments of the present invention will be described more fully hereinafter with reference to the accompanying drawings, in which exemplary embodiments of the invention are shown. Throughout the drawings and the detailed description, unless otherwise noted, the same drawing reference numerals are understood to refer to the same elements, features, and structures. In describing the exemplary embodiments, detailed description of known configurations or functions may be omitted for clarity and conciseness.

Further, the description herein is related to a wireless communication network, and an operation performed in a wireless communication network may be performed through a process of controlling a network and transmitting data by a system that controls a wireless network, e.g., a base station (BS), or may be performed in a user equipment (UE) connected to the wireless communication network.

That is, it is apparent that various operations, which are performed for communicating with a terminal in a network composed of a plurality of network nodes including a base station (BS), are executable by the BS or other network nodes excluding the BS. 'Base station' may be replaced with terms such as a fixed station, a Node B, an eNode B (eNB), an access point (AP), and the like. Also, 'Terminal' may be replaced with terms such as a User Equipment (UE), a Mobile Station (MS), a Mobile Subscriber Station (MSS), a Subscriber Station (SS), a non-AP station (non-AP STA), and the like.

While the present invention has been shown and described in connection with the embodiments, it will be apparent to those skilled in the art that modifications and variations can be made without departing from the spirit and scope of the invention as defined by the appended claims. Thus, the present invention is not limited to the foregoing embodiments and may include all the embodiments within the scope of the appended claims. For example, various exemplary embodiments have been described with respect to 3GPP LTE or LTE-A systems; however, aspects of the illustrated embodiments may be applied to other mobile communication systems.

FIG. 1 is a diagram illustrating the configuration of a wireless device according to the present invention.

FIG. 1 illustrates a UE 100 that corresponds to an example of a downlink receiving device or an uplink transmitting device, and an eNB 200 that corresponds to an example of a downlink transmitting device or an uplink receiving device. Although not illustrated in FIG. 1, a second UE that performs Vehicle-to-Everything (V2X) communication with the first UE 100 may exist. The configuration of the second UE is similar to that of the first UE 100, and thus detailed descriptions thereof will be omitted.

The UE 100 may include a processor 110, an antenna unit 120, a transceiver 130, and a memory 140.

The processor 110 may process signals related to a baseband, and may include a higher layer processing unit 111 and a physical layer processing unit 112. The higher layer processing unit 111 may process the operations of a Medium Access Control (MAC) layer, a Radio Resource Control (RRC) layer, or a higher layer. The physical layer processing unit 112 may process the operations of a PHY layer (e.g., processing an uplink transmission signal or processing a downlink reception signal). The processor 110 may control the general operations of the UE 100, in addition to processing signals related to a baseband.

The antenna unit 120 may include one or more physical antennas, and may support MIMO transmission/reception when a plurality of antennas are included. The transceiver 130 may include a Radio Frequency (RF) transmitter and an RF receiver. The memory 140 may store information processed by the processor 110, software, an operating system, applications, or the like associated with the operations of the UE 100, and may include elements such as a buffer or the like.

The eNB 200 may include a processor 210, an antenna unit 220, a transceiver 230, and a memory 240.

The processor 210 processes signals related to a baseband, and may include a higher layer processing unit 211 and a physical layer processing unit 212. The higher layer processing unit 211 may process the operations of a MAC layer, an RRC layer, or a higher layer. The physical layer processing unit 212 may process the operations of a PHY layer (e.g., processing a downlink transmission signal or processing an uplink reception signal). The processor 210 may control the general operations of the eNB 200 in addition to processing signals related to a baseband.

The antenna unit 220 may include one or more physical antennas, and may support MIMO transmission/reception when a plurality of antennas are included. The transceiver 230 may include an RF transmitter and an RF receiver. The memory 240 may store information processed by the processor 210, software, an operating system, applications, or the like associated with the operations of the eNB 200, and may include elements such as a buffer or the like.

The processor 110 of the UE 100 may be configured to implement the operations of the UE, which have been described in all of the embodiments of the present invention.

An example of a radio frame structure will be described below.

Figure 2:
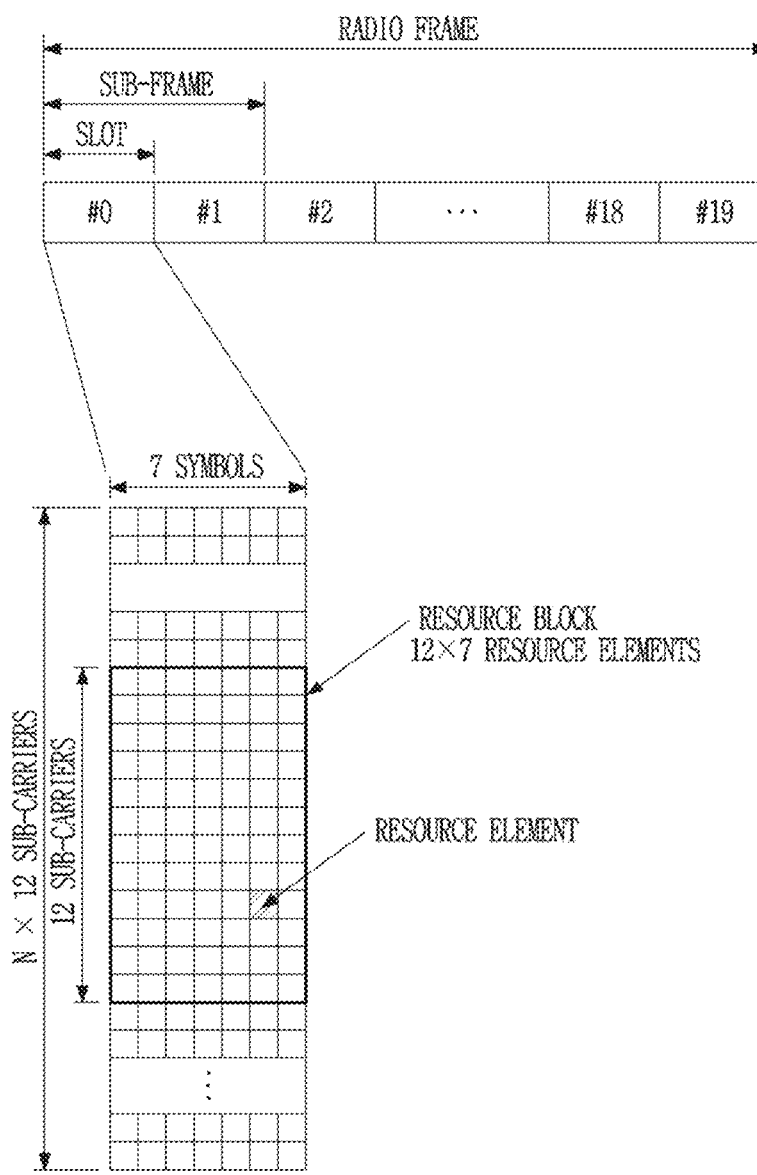
FIGS. 2 and 3 are diagrams illustrating the structure of a radio frame of a 3GPP LTE system.
Figure 3:
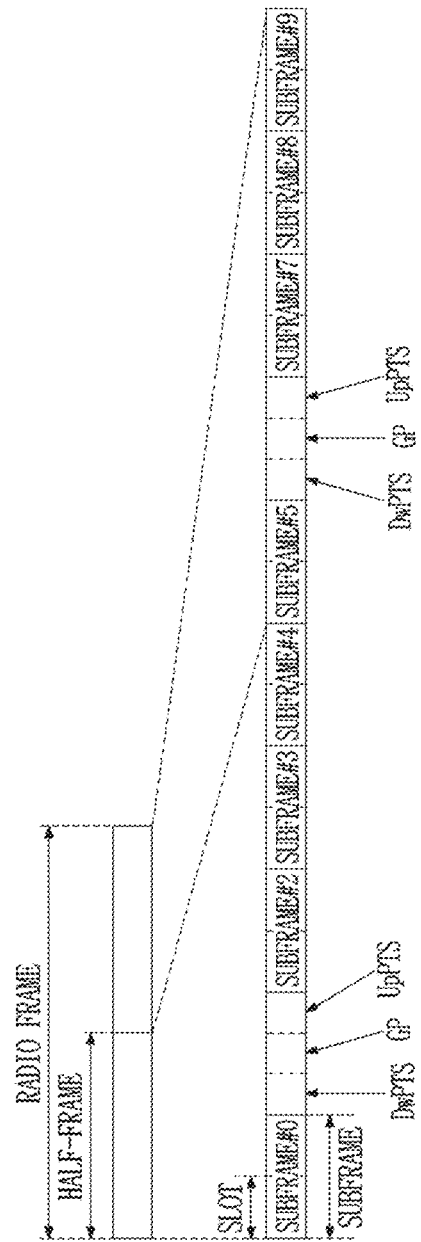

FIGS. 2 and 3 are diagrams illustrating the structure of a radio frame of a 3GPP LTE system.

In a cellular wireless packet communication system, uplink transmission or downlink transmission is executed in units of subframes. A single subframe is defined as a predetermined period of time including a plurality of symbols. The 3GPP LTE standard supports radio frame structure type 1, which is applied to Frequency Division Duplex (FDD), and radio frame structure type 2, which is applied to Time Division Duplex (TDD).

FIG. 2 illustrates radio frame structure type 1. A single radio frame is composed of 10 subframes, and a single subframe is composed of 2 slots in the time domain. A time expended for transmitting a single subframe is a Transmission Time Interval (TTI). For example, the length of a single subframe is 1 ms, and the length of a single slot is 0.5 ms. A single slot may include a plurality of symbols in the time domain. The symbol may be an Orthogonal Frequency Division Multiplexing (OFDM) symbol in the downlink, or may be a Single Carrier-Frequency Division Multiple Access (SC-FDMA) in the uplink, but the symbol may not be limited thereto. The number of symbols included in a single slot may be different based on a Cyclic Prefix (CP) configuration. The CP may include an extended CP and a normal CP. In the case of the normal CP, for example, the number of symbols included in a single slot may be 7. In the case of the extended CP, the length of a symbol is extended and thus, the number of symbols included in a single slot may be 6, which is smaller than the normal CP. When the size of a cell is large, or when a channel state is unstable (e.g., as when a User Equipment (UE) moves quickly or the like), an extended CP may be used to reduce inter-symbol interference.

In FIG. 2, by assuming the case of a normal CP in a resource grid, a single slot corresponds to 7 symbols in the time domain. In the frequency domain, a system bandwidth is defined as integer (N) times a Resource Block (RB), a downlink system bandwidth is indicated by a parameter $N^{DL}$, and an uplink system bandwidth is indicated by a parameter $N^{DL}$. A resource block is a resource allocation unit, and may correspond to a plurality of symbols (e.g., 7 symbols) in a single slot in the time domain and a plurality of consecutive subcarriers (e.g., 12 subcarriers) in the frequency domain. Each element in a resource grid is referred to as a Resource Element (RE). A single resource block includes 12×7 REs. The resource grid in FIG. 2 may be applied equally to an uplink slot and a downlink slot. Also, the resource grid in FIG. 2 may be equally applied to a slot of radio frame type 1 and a slot of radio frame type 2, which will be described as follows.

FIG. 3 illustrates radio frame structure type 2. Radio frame structure type 2 is composed of 2 half frames; each half frame may be composed of 5 subframes, a Downlink Pilot Time Slot (DwPTS), a Guard Period (GP), and an Uplink Pilot Time Slot (UpPTS). As in radio frame type 1, a single subframe is composed of 2 slots. The DwPTS is used for initial cell search, synchronization, or channel estimation in a UE, in addition to transmission/reception of data. The UpPTS is used for channel estimation and the UE's uplink transmission synchronization in an eNB. The GP is a period between the uplink and the downlink for removing any interference generated in the uplink due to a multi-path delay from a downlink signal. The DwPTS, GP, and UpPTS may be also referred to as special subframes.

Figure 4:
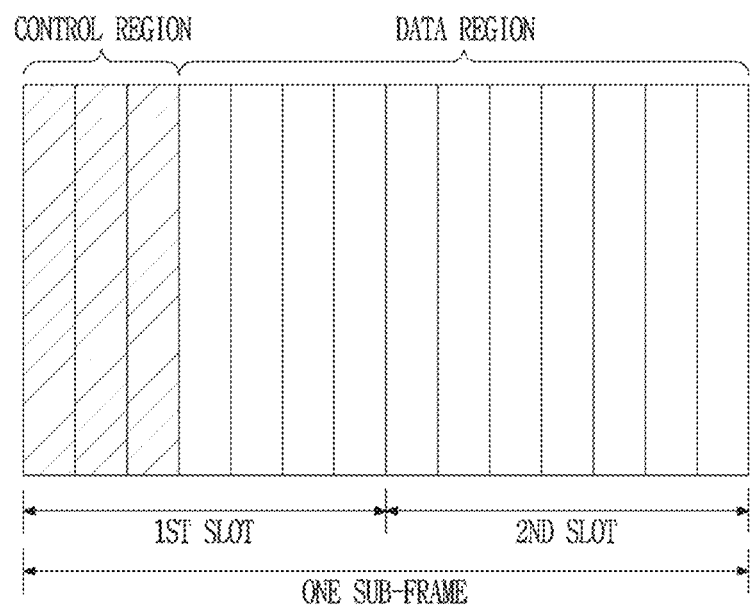
FIG. 4 is a diagram illustrating the structure of a downlink subframe.

FIG. 4 is a diagram illustrating the structure of a downlink subframe. A plurality of OFDM symbols (e.g., 3 OFDM symbols) disposed in the front part of a first slot in a single subframe may correspond to the control region to which a control channel is allocated. The remaining OFDM symbols correspond to a data region to which a Physical Downlink Shared Channel (PDSCH) is allocated. The downlink control channels used in the 3GPP LTE system may include a Physical Control Format Indicator Channel (PCFICH), a Physical Downlink Control Channel (PDCCH), a Physical Hybrid automatic repeat request Indicator Channel (PHICH), and the like. In addition, an Enhanced Physical Downlink Control Channel (EPDCCH) may be transmitted to UEs set by an eNB in the data region.

The PCFICH is transmitted in the first OFDM symbol of a subframe, and may include information associated with the number of OFDM symbols used for a control channel transmission in the subframe.

The PHICH is a response to an uplink transmission, and includes HARQ-ACK information.

Control information transmitted through the (E)PDCCH is referred to as downlink control information (DCI). The DCI includes uplink or downlink scheduling information, or may include other control information based on various purposes, such as a command for controlling an uplink transmission power with respect to a UE group or the like. An eNB determines an (E)PDCCH format based on the DCI transmitted to a UE, and assigns a Cyclic Redundancy Check (CRC) to that control information. The CRC is masked with a Radio Network Temporary Identifier (RNTI) based on the owner or the purpose of the (E)PDCCH. When the (E)PDCCH is intended for a predetermined UE, the CRC may be masked with a cell-RNTI (C-RNTI) for the UE. Alternatively, when the PDCCH is for a paging message, the CRC may be masked with a paging indicator identifier (P-RNTI). When the PDCCH is for a system information block (SIB), the CRC may be masked with a system information identifier and a system information RNTI (SI-RNTI). To indicate a random access response with respect to a random access preamble transmission of a UE, the CRC may be masked with a random access-RNTI (RA-RNTI).

Figure 5:
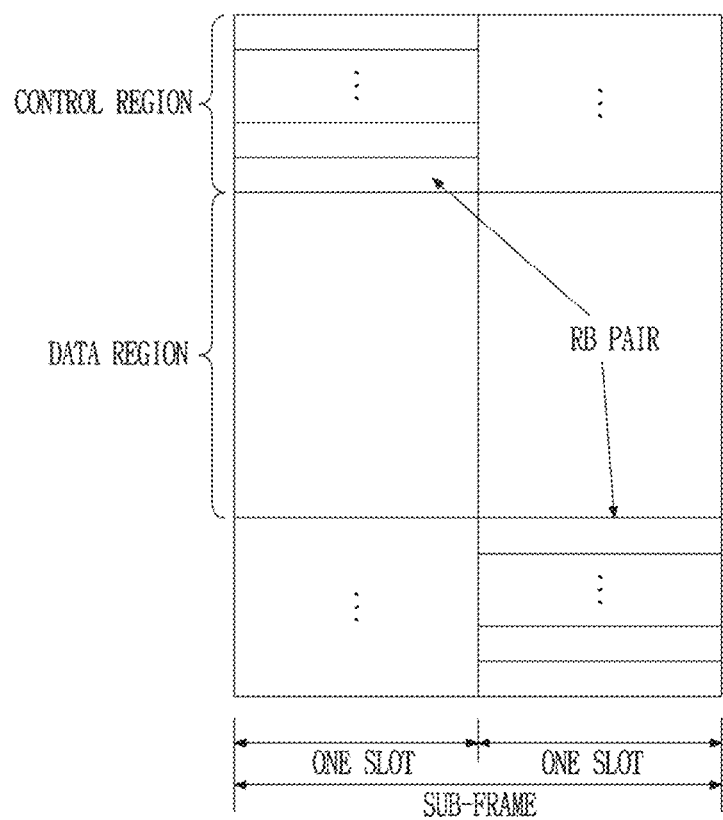
FIG. 5 is a diagram illustrating the structure of an uplink subframe.

FIG. 5 is a diagram illustrating the structure of an uplink subframe. An uplink subframe may be divided into a control region and a data region in the frequency domain. A physical uplink control channel (PUCCH) including uplink control information may be allocated to the control region. A physical uplink shared channel (PUSCH) including user data may be allocated to the data region. A PUCCH for a single terminal may be allocated to a resource block pair (RB pair) in a subframe. The resource blocks included in the RB pair may occupy different sub-carriers with respect to two slots. This indicates that the RB pair allocated to a PUCCH is frequency-hopped at a slot boundary.

Figure 6:
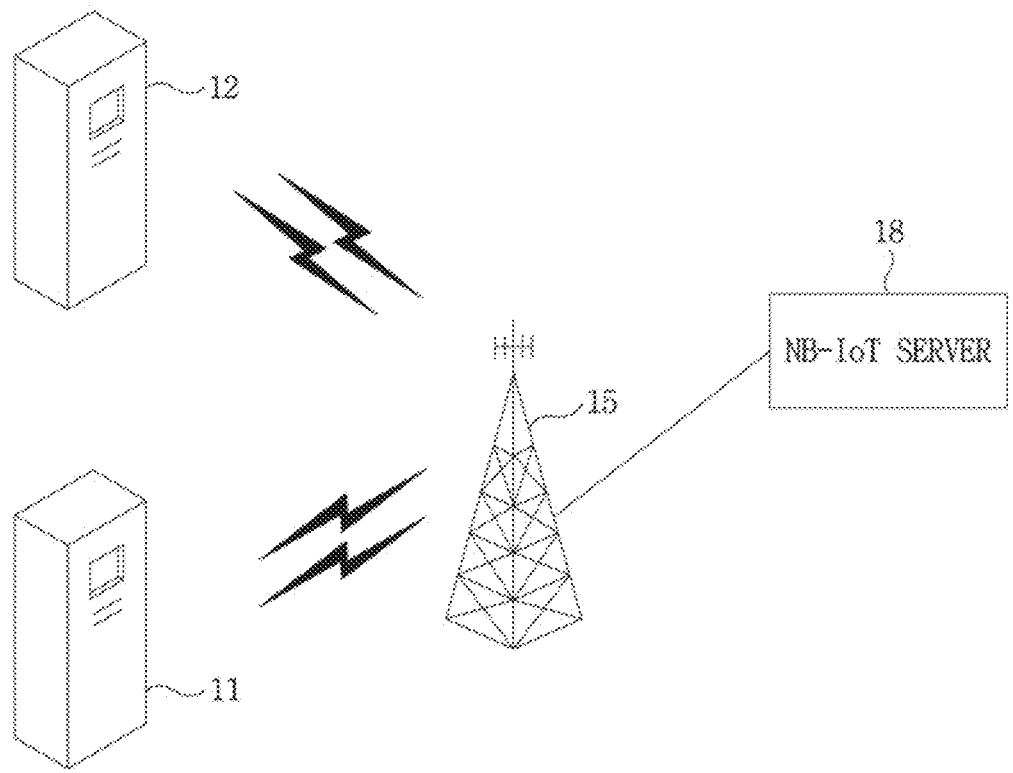
FIG. 6 is a diagram illustrating an example of an NB-IoT network.

FIG. 6 is a diagram illustrating an example of NB-IoT according to the present invention.

From the perspective of Internet of Things (IoT) system, NB-IoT may be connected to the basic concept of Machine-Type Communication (MTC) or Machine to Machine (M2M) communication, except for the fact that NB-IoT uses a narrow band. NB-IoT may include the exchange of information between NB-IoT UEs 11 and 12 through an eNB 15, excluding human interaction, or may include the exchange of information between the NB-IoT UE 11 and 12 and an NB-IoT server 18 through an eNB.

The NB-IoT server 18 may be an entity that communicates with the NB-IoT UEs 11 and 12. The NB-IoT server may execute an NB-IoT-related application, and may provide an NB-IoT-specific service to the NB-IoT UEs 11 and 12.

The NB-IoT UEs 11 and 12 may be stationary or mobile wireless devices that perform NB-IoT communication.

Figure 7A:
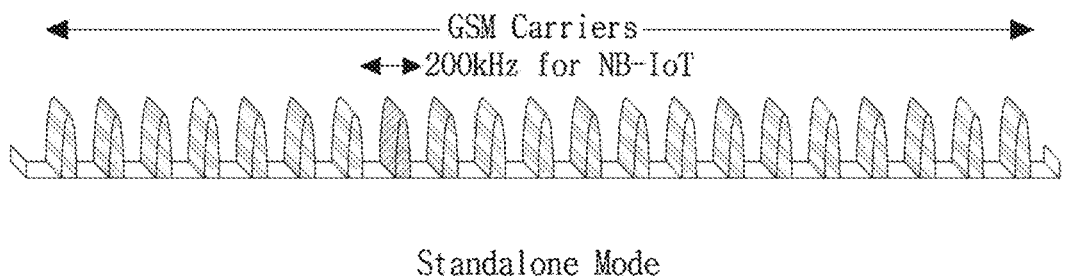
FIGS. 7A, 7B, and 7C are diagrams illustrating an NB-IoT operation mode.
Figure 7B:
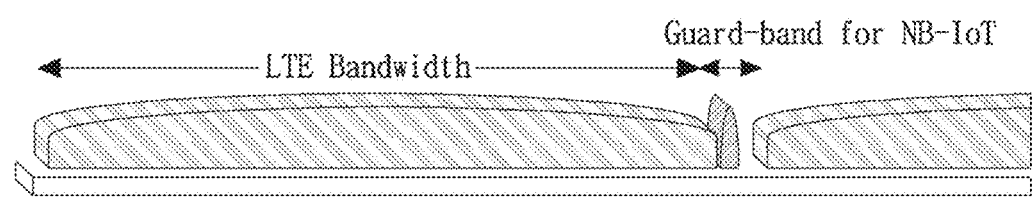
Figure 7C:
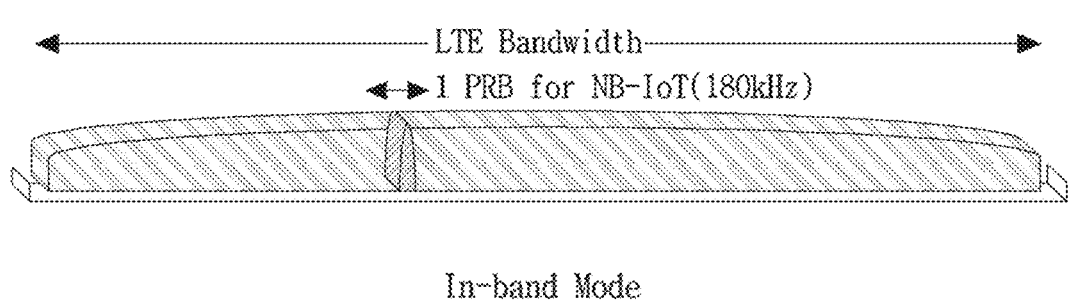

FIGS. 7A, 7B, and 7C are diagrams illustrating an NB-IoT operation mode according to the present invention.

NB-IoT may operate in one of three operation modes as shown in FIGS. 7A, 7B, and 7C. The three operation modes are a standalone operation mode, a guard-band operation mode, and an in-band operation mode.

FIG. 7A illustrates a standalone operation mode. A spectrum currently used in an Enhanced Data Rates for GSM Evolution (GSM/EDGE) Radio Access Network (GERAN) system, which corresponds to one or more Global System for Mobile Communications (GSM) carriers, may be used. For example, one of the GSM carriers (e.g., a frequency region of a 200 kHz-bandwidth) may be used for NB-IoT.

FIG. 7B illustrates a guard-band operation mode. Resource blocks, which are not used in a guard-band existing outside the bandwidth of an LTE carrier, may be used.

FIG. 7C illustrates an in-band operation mode. Resource blocks in the bandwidth of an LTE carrier may be used. For example, one PRB in the LTE bandwidth (e.g., a frequency region of a 180 kHz-bandwidth) may be used for NB-IoT.

NB-IoT devices aim to mainly support scenarios in which NB-IoT devices are operated in buildings or in the basements of buildings in order to provide a smart metering service, a smart home service, an alarm service, or the like. This may mean that reliable data transmission/reception needs to be supported in rooms or basements that are generally known to be low-performance areas, irrespective of the deployment of NB-IoT devices. Furthermore, lower power consumption and less complexity need to be maintained, and at the same time, connections to multiple NB-IoT devices (50,000 NB-IoT devices from the perspective of a single cell) need to be maintained. The requirements of an NB-IoT system, which are currently based on the technologies associated with the GERAN system, are shown in Table 1.

TABLE 1

| Performance | Objectives |
| --- | --- |
| Improved indoor coverage | MCL (Maximum Coupling Loss) 164 dB |
| Cell Capacity | 52574 devices per cell |
| Reduced complexity | Very cheap based on mass scale deployment or in a disposable manner |
| Improved power efficiency | About 10-year battery life |
| Latency | 10 seconds for Mobile Autonomous Reporting (MAR) exception reports (in general support relaxed delay characteristics |
| Coexistence | GSM/WCDMA/LTE |

The present invention describes operations of a system in which different Positioning Reference Signals (PRS) are defined. The different PRSs may be referred to as a first PRS and a second PRS. For example, the first PRS may be a PRS used in an NB-IoT environment (hereinafter an NB-PRS), and the second PRS may be a PRS defined in an LTE system (hereinafter LTE PRS). Although the following examples are described by assuming that the first PRS is an NB-PRS and the second PRS is an LTE PRS, the scope of the present invention may not be limited thereto, and examples of the present invention may be applied when different PRSs are defined.

Before the examples of the present invention associated with an NB-PRS, an LTE PRS will be described.

An LTE PRS may only be transmitted in a downlink subframe configured for a PRS transmission through higher layer signaling. When both a normal subframe #0 and a Multicast Broadcast Single Frequency Network (MBSFN) subframe are configured as positioning subframes, the OFDM symbols in the MBSFN positioning subframe need to use the same Cyclic Prefix (CP) as that of subframe #0. When only an MBSFN subframe is configured as a positioning subframe, the symbols in the corresponding MBSFN subframe configured to transmit a PRS need to use an extended CP.

The LTE PRS is transmitted through antenna port (AP) #6.

The LTE PRS cannot be allocated to time/frequency resources to which a Physical Broadcast Channel (PBCH), and a Primary Synchronization Signal (PSS)/Secondary Synchronization Signal (SSS) are allocated.

The LTE PRS is defined in an environment where a subcarrier space is 15 kHz (i.e., Δf=15 kHz).

An LTE PRS sequence may be generated using a Gold-sequence-based pseudo-random sequence generator as shown in Equation 1 provided below. The pseudo-random sequence generator may be initialized to $c_{init}$ at the start of each OFDM symbol as shown in Equation 2.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 1]
$$m = 0, 1, \ldots, 2N_{RB}^{max,DL} - 1$$

$$c_{init} = $$ [Equation 2]
$$2^{10} \cdot (7 \cdot (n_s + 1) + l + 1) \cdot (2 \cdot N_{ID}^{cell} + 1) + 2 \cdot N_{ID}^{cell} + N_{CP}$$
$$N_{CP} = \begin{cases} 1 & \text{for normal } CP \\ 0 & \text{for extended } CP \end{cases}$$

In Equation 1, l denotes a symbol index, $n_s$ denotes a slot index, and $N^{max,DL}RB$ denotes the maximum number of downlink resource blocks. In Equation 2, $N^{cell}_{ID}$ denotes a physical layer cell identity. As shown in Equation 1, the LTE PRS is always generated based on the maximum number of downlink resource blocks ($N^{max,DL}_{RB}$), although the location and the size of a resource block to which the LTE PRS is actually mapped may vary.

In a downlink subframe configured for LTE PRS transmission, the LTE PRS sequence may be mapped to an RE; the RE's location may be determined based on Equation 3 for a normal CP, or may be determined based on Equation 4 for an extended CP.

$$a_{k,l}^{(p)} = r_{l,n_s}(m')$$ [Equation 3]
$$k = 6(m + N_{RB}^{DL} - N_{RB}^{PRS}) + (6 - l + v_{shift}) \bmod 6$$
$$l = \begin{cases} 3, 5, 6 & \text{if } n_s \bmod 2 = 0 \\ 1, 2, 3, 5, 6 & \text{if } n_s \bmod 2 = 1 \text{ and} \\ & (1 \text{ or } 2 \text{ } PBCH \text{ } antennaports) \\ 2, 3, 5, 6 & \text{if } n_s \bmod 2 = 1 \text{ and} \\ & (4 \text{ } PBCH \text{ } antennaports) \end{cases}$$
$$m = 0, 1, \ldots, 2 \cdot N_{RB}^{PRS} - 1$$
$$m' = m + N_{RB}^{max,DL} - N_{RB}^{PRS}$$

$$a_{k,l}^{(p)} = r_{l,n_s}(m')$$ [Equation 4]
$$k = 6(m + N_{RB}^{DL} - N_{RB}^{PRS}) + (5 - l + v_{shift}) \bmod 6$$
$$l = \begin{cases} 4, 5 & \text{if } n_s \bmod 2 = 0 \\ 1, 2, 4, 5 & \text{if } n_s \bmod 2 = 1 \text{ and} \\ & (1 \text{ or } 2 \text{ } PBCH \text{ } antennaports) \\ 2, 4, 5 & \text{if } n_s \bmod 2 = 1 \text{ and} \\ & (4 \text{ } PBCH \text{ } antennaports) \end{cases}$$
$$m = 0, 1, \ldots, 2 \cdot N_{RB}^{PRS} - 1$$
$$m' = m + N_{RB}^{max,DL} - N_{RB}^{PRS}$$

$$v_{shift} = N_{ID}^{cell} \bmod 6$$ [Equation 5]

In Equations 3 and 4, a reference signal sequence $r_{l,n_s}(m')$ from Equation 1 may be mapped to a complex-valued modulation symbol $a^{(p)}_{k,l}$ which is used as a reference signal for an antenna port P. Here, k denotes a subcarrier index, $N^{DL}RB$ denotes a downlink bandwidth configuration (e.g., the number of RBs allocated for a downlink), $N^{PRS}_{RB}$ denotes an LTE PRS bandwidth configured by a higher layer, and $v_{shift}$ denotes a cell-specific frequency deviation value as shown in Equation 5. In Equations 3 and 4, m' indicates that a PRB for an LTE PRS is located in a frequency region at the center of a bandwidth corresponding to the maximum number of downlink resource blocks. That is, out of the sequences generated based on the maximum number of downlink resource blocks according to Equation 1, the only sequence actually mapped to an RE according to Equations 3 and 4 is a sequence corresponding to the location of a PRB to which the LTE PRS is mapped.

Figure 8:
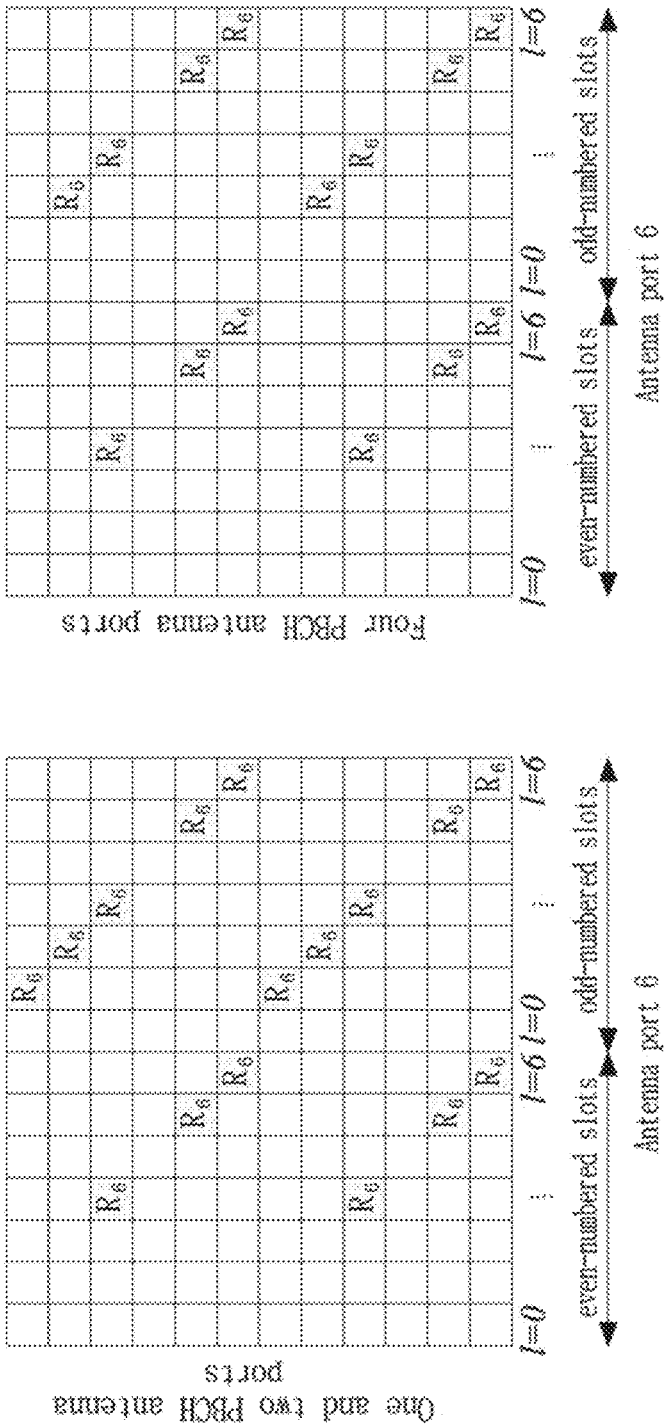
FIGS. 8 and 9 are diagrams illustrating an RE pattern in which an LTE PRS is mapped to a single resource block pair.
Figure 9:
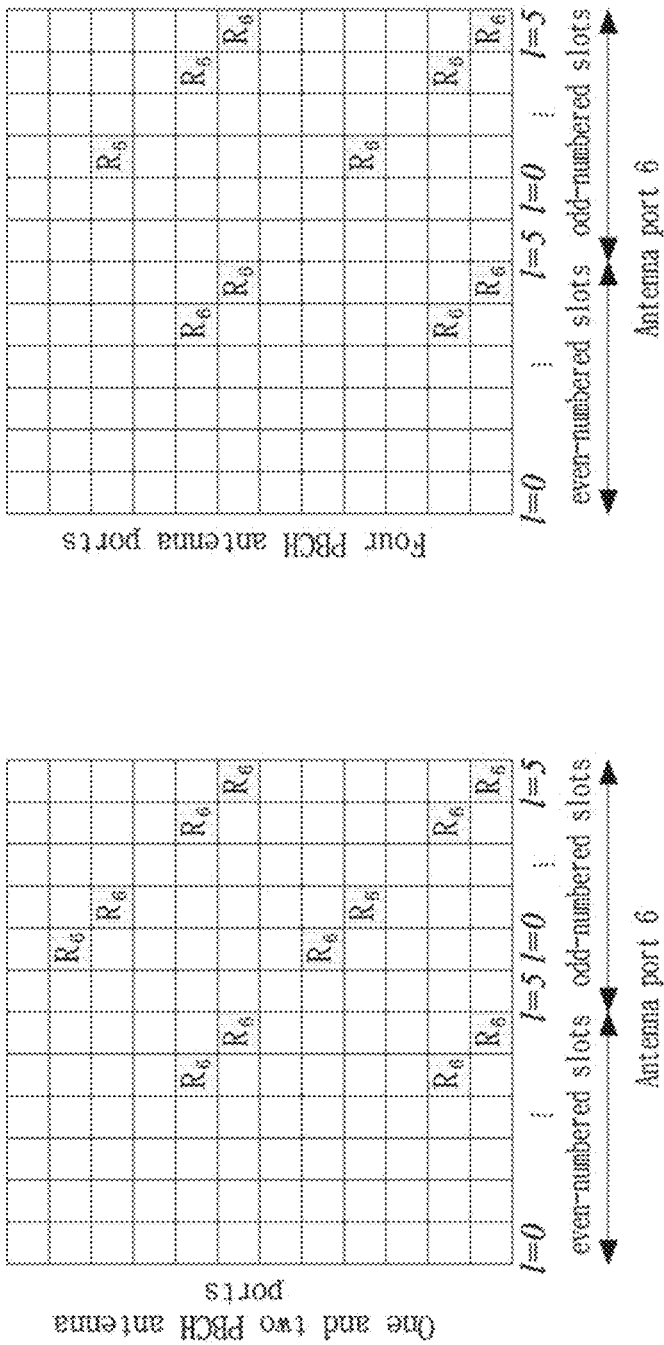

FIGS. 8 and 9 are diagrams illustrating an RE pattern in which an LTE PRS is mapped to a single resource block pair.

FIG. 8 illustrates examples of the location of an RE to which an LTE PRS is mapped when the number of PBCH antenna ports is 1 or 2 and the number of PBCH antenna ports is 4 in the case of the normal CP.

FIG. 9 illustrates examples of the location of an RE to which an LTE PRS is mapped when the number of PBCH antenna ports is 1 or 2 and the number of PBCH antenna ports is 4 in the case of the extended CP.

Subsequently, a subframe configuration associated with an LTE PRS will be described.

A cell-specific subframe configuration period $T_{PRS}$ and an offset $\Delta_{PRS}$ for LTE PRS transmission may be set according to Table 2 below. $T_{PRS}$ and $\Delta_{PRS}$ corresponding to the value of $I_{PRS}$ provided through higher layer signaling may also be determined based on Table 2 provided below. Accordingly, an LTE PRS transmission subframe is determined by a period of $T_{PRS}$ based on a subframe that is $\Delta_{PRS}$ distant from a subframe corresponding to System Frame Number (SFN) 0. Here, the LTE PRS may be transmitted on $N_{PRS}$ consecutive downlink subframes from the subframe determined by $T_{PRS}$ and $\Delta_{PRS}$, and the value of $N_{PRS}$ may be provided to a UE through higher layer signaling. That is, each LTE PRS positioning occasion may include $N_{PRS}$ consecutive downlink subframes.

TABLE 2

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$ - 160 |
| 480-1119 | 640 | $I_{PRS}$ - 480 |
| 1120-2399 | 1280 | $I_{PRS}$ - 1120 |
| 2400-4095 | Reserved | |

Table 3 illustrates an example of high layer signaling associated with an LTE PRS configuration.

TABLE 3

```
-- ASN1START
PRS-Info ::= SEQUENCE {
    prs-Bandwidth          ENUMERATED { n6, n15, n25, n50, n75, 100, ... },
    prs-ConfigurationIndex INTEGER (0..4095),
    numDL-Frames           ENUMERATED {sf-1, sf-2, sf-4, sf-6, ...},
    ...,
    prs-MutingInfo-r9      CHOICE {
        po2-r9                     BIT STRING (SIZE(2)),
        po4-r9                     BIT STRING (SIZE(4)),
        po8-r9                     BIT STRING (SIZE(8)),
        po16-r9                    BIT STRING (SIZE(16)),
        ...
    }
                           OPTIONAL        --Need OP
}
-- ASN1STOP
```

An information element from Table 3 may be referred to as PRS-Info, and may provide information associated with an LTE PRS configuration in a cell.

LTE PRS configuration information may include configuration information of an LTE PRS (e.g., an LTE PRS for the Observed Time Difference Of Arrival (OTDOA)) for a single reference serving cell from an LTE positioning protocol (LPP) layer, that is, a location server. The LTE PRS configuration information may be provided to a UE via an eNB.

The LTE PRS configuration information may include the parameters shown in Table 3. Particularly, a PRS bandwidth (prs-Bandwidth) is a value which corresponds to a bandwidth used for configuring an LTE PRS, and is expressed as the number of PRBs. The value of a PRS configuration index (prs-ConfigurationIndex) may indicate the value of $I_{PRS}$ as shown in Table 2, and a PRS period ($T_{PRS}$) and an offset value ($\Delta_{PRS}$) may be set based thereon. The number of downlink subframes (numDL-Frames) may indicate the number of consecutive subframes ($N_{PRS}$) in which an LTE PRS is transmitted. PRS muting information provides information associated with a PRS muting configuration of a cell, is counted using an LTE PRS positioning occasion as a unit, and is indicated in bitmap form having a period of $T_{REP}$. When a bit is 0, LTE PRS transmission is not performed in all downlink subframes in the corresponding PRS positioning occasion (i.e., the LTE PRS transmission is muted).

Figure 10:
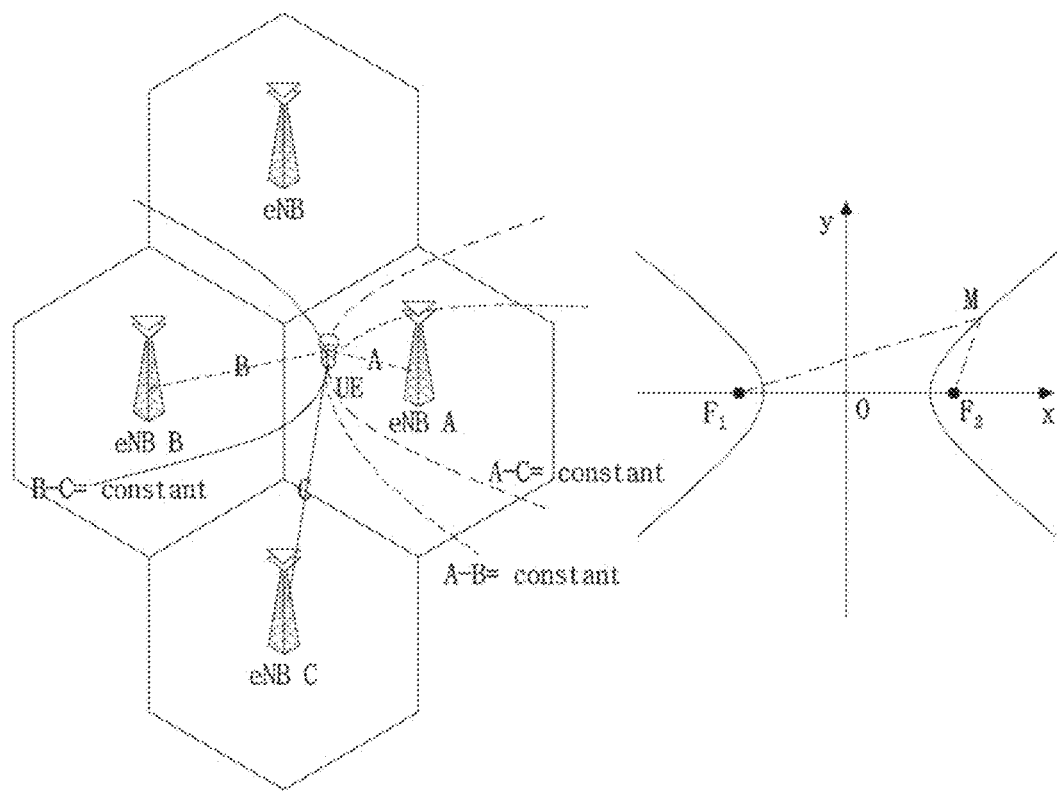
FIG. 10 is a diagram illustrating an Observed Time Difference Of Arrival (OTDOA).

FIG. 10 is a diagram illustrating an Observed Time Difference Of Arrival (OTDOA) scheme according to the present invention.

OTDOA is a positioning scheme in which a communication satellite transmits information to a terrestrial station in LTE. OTDOA is based on measuring the difference in arrival time of radio signals transmitted from various locations. A plurality of cells transmits reference signals, and a UE may receive the same. Because the distances between the plurality of cells and the UE are different, the UE will receive the reference signals transmitted from the plurality of cells at different times. The time differences may be recorded by the UE and may be transmitted to a network. The network combines the time differences and the antenna location information of each cell to calculate the location of the UE. At least three cells may be measured by the UE, and those cells may include a reference cell and a neighboring cell.

The difference in time between when the UE receives reference signals from a pair of eNBs is defined as a Reference Signal Time Difference (RSTD). The position measurement is based on measuring an OTDOA for a predetermined reference signal, which is included in a downlink signal received from other eNBs.

Figure 11:
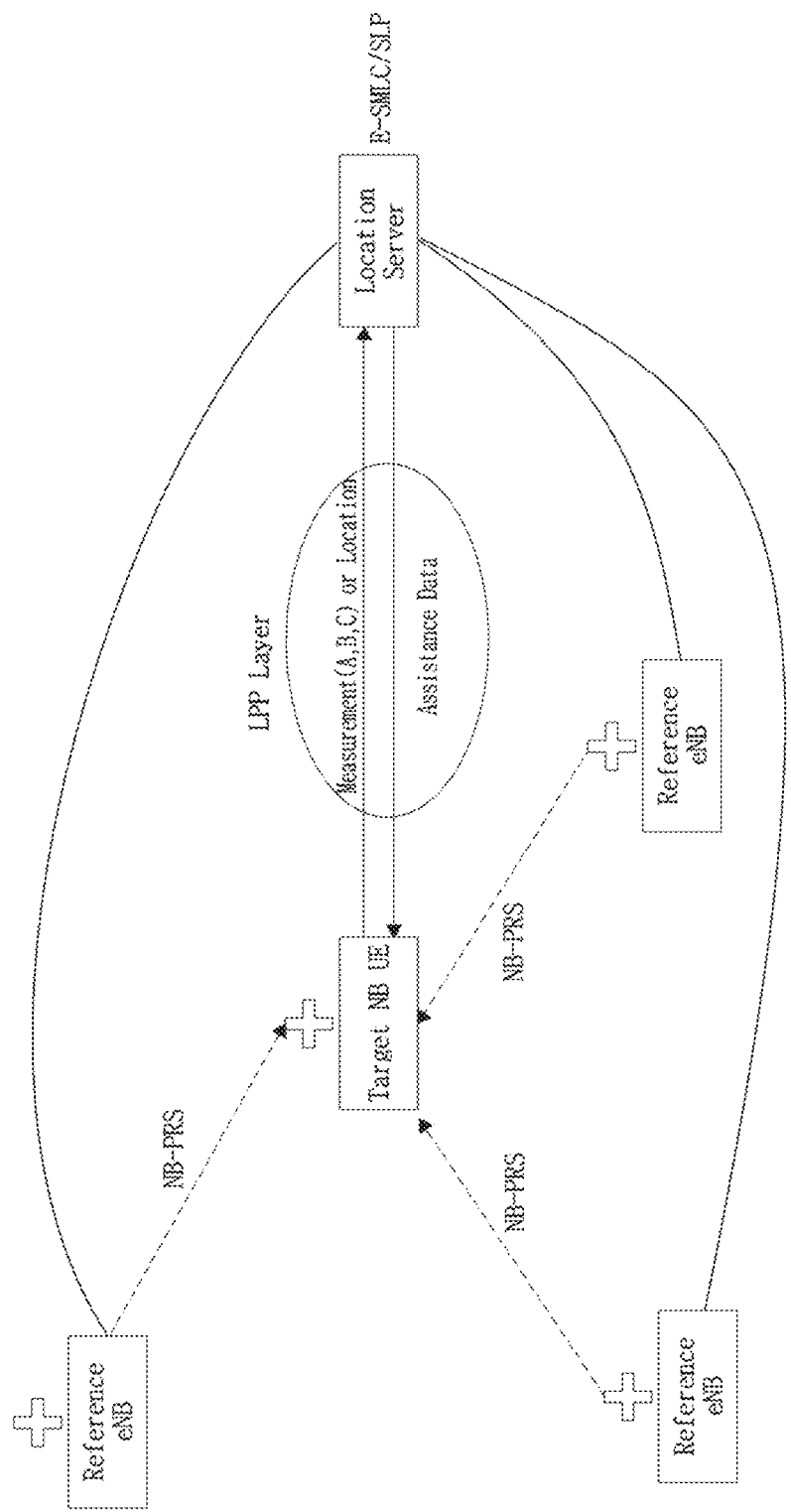
FIG. 11 is a diagram illustrating a control plane and a user plane of an LTE positioning protocol (LPP).

FIG. 11 is a diagram illustrating a control plane and a user plane of an LTE Positioning Protocol (LPP) according to the present invention.

The positioning technology may consist of an Enhanced Cell ID (E-CID), Observed Time Difference of Arrival (OTDOA), a Global Navigation Satellite System (A-GNSS), and the like, which are capable of supporting positioning solutions for a control plane and a user plane at the same time. An LTE network-based positioning function is managed by an Evolved-Serving Mobile Location Centre (E-SMLC)/Secure User Plane Location (SUPL) Location Platform (SLP).

Next, examples of the present invention associated with an NB-PRS, which is distinguished from an LTE PRS, will be described.

An NB-PRS may be defined briefly from four aspects. First, the NB-PRS is defined by an RE pattern in which the NB-PRS is mapped to a single PRB-pair (i.e., a single subframe in the time domain and a single PRB in the frequency domain). Second, the NB-PRS is defined by a sequence generated for the NB-PRS. Third, the NB-PRS is defined by the location and the size of a frequency band in which the NB-PRS is transmitted in the whole system band. Fourth, the NB-PRS is defined by the locations and the number of subframes to which the NB-PRS is mapped in the time domain.

FIGS. 12A, 12B, 12C, 13A, 13B, and 13C are diagrams illustrating an RE pattern in an NB-PRS transmission subframe according to the present invention.

Figure 12A:
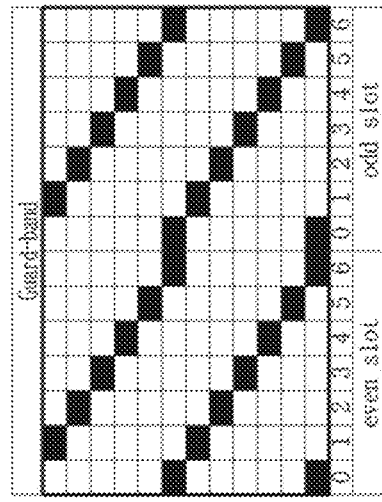
FIGS. 12A, 12B, 12C, 13A, 13B, and 13C are diagrams illustrating an RE pattern in an NB-PRS transmission subframe.
Figure 12B:
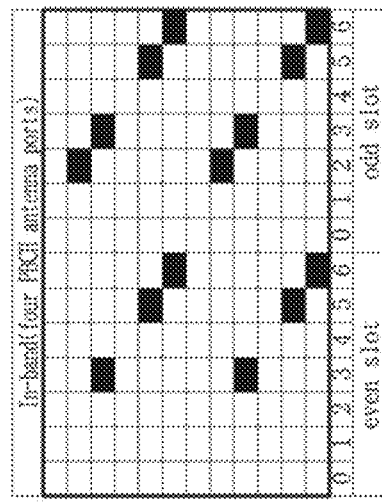
Figure 12C:
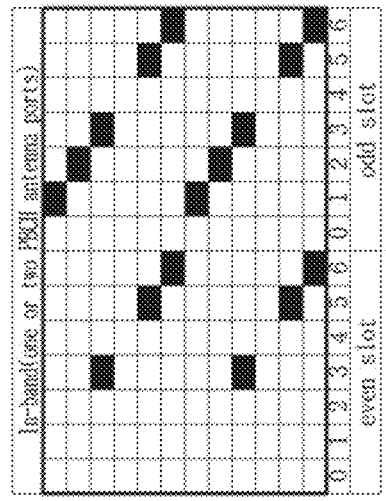

FIGS. 12A, 12B, and 12C illustrate NB-PRS RE patterns in the case of a normal CP. FIG. 12A illustrates an NB-PRS RE pattern when the number of PBCH antenna ports is 1 or 2 in an in-band operation mode. FIG. 12B illustrates an NB-PRS RE pattern when the number of PBCH antenna ports is 4 in an in-band operation mode. FIG. 12C illustrates an NB-PRS RE pattern in a guard-band operation mode.

Figure 13A:
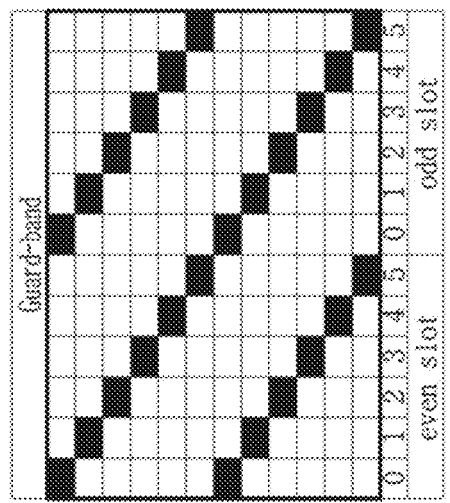
Figure 13B:
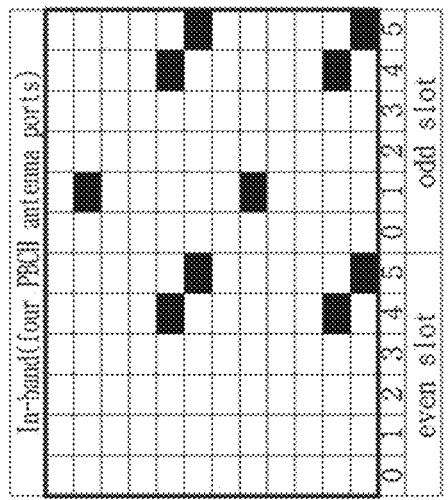
Figure 13C:
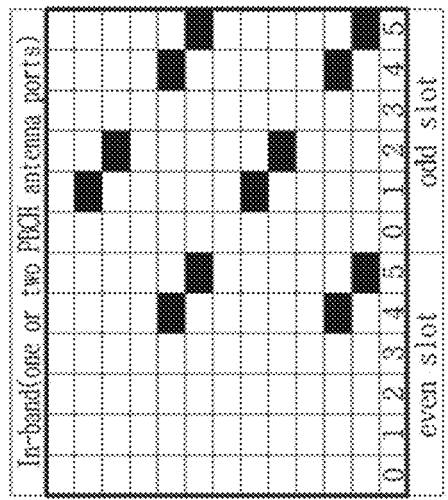

FIGS. 13A, 13B, and 13C illustrate NB-PRS RE patterns in the case of an extended CP. FIG. 13A illustrates an NB-PRS RE pattern when the number of PBCH antenna ports is 1 or 2 in an in-band operation mode. FIG. 13B illustrates an NB-PRS RE pattern when the number of PBCH antenna ports is 4 in an in-band operation mode. FIG. 13C illustrates an NB-PRS RE pattern in a guard-band operation mode.

An NB-PRS RE pattern in subframes is the same as an LTE PRS RE pattern in subframes. In this instance, in the in-band operation mode, a PRS is not mapped onto an OFDM symbol where an LTE control region and a Cell-specific Reference Signal (CRS) are mapped. In the guard-band operation mode, an NB-PRS may be mapped onto all OFDM symbols because an LTE control region and a CRS transmission do not exist.

The RE patterns of the normal CP of FIGS. 12A, 12B, and 12C may be expressed by Equation 6 or 7, and the RE patterns of the extended CP of FIGS. 13A, 13B, and 13C may be expressed by Equation 8 or 9.

$$a_{k,l}^{(p)} = r_{l,n_s}(m') \quad \text{[Equation 6]}$$
In-band
$$k = 6 \cdot m + (6 - l + v_{shift}) \bmod 6$$
$$l = \begin{cases} 3, 5, 6 & \text{if } n_s \bmod 2 = 0 \\ 1, 2, 3, 5, 6 & \text{if } n_s \bmod 2 = 1 \text{ and} \\ & \text{(1 or 2 } PBCH \text{ antenna ports)} \\ 2, 3, 5, 6 & \text{if } n_s \bmod 2 = 1 \text{ and} \\ & \text{(4 } PBCH \text{ antenna ports)} \end{cases}$$
$$m = 0, 1$$
$$m' = m + 2 \cdot n_{NPRB}$$
Guard-band
$$k = 6 \cdot m + (6 - l + v_{shift}) \bmod 6$$
$$l = 0, 1, 2, 3, 4, 5, 6$$
$$m = 0, 1$$
$$m' = m + 2 \cdot n_{NPRB}$$

$$a_{k,l}^{(p)} = r_{l,n_s}(m) \quad \text{[Equation 7]}$$
In-band
$$k = 6 \cdot m + (6 - l + v_{shift}) \bmod 6$$
$$l = \begin{cases} 3, 5, 6 & \text{if } n_s \bmod 2 = 0 \\ 1, 2, 3, 5, 6 & \text{if } n_s \bmod 2 = 1 \text{ and} \\ & \text{(1 or 2 } PBCH \text{ antenna ports)} \\ 2, 3, 5, 6 & \text{if } n_s \bmod 2 = 1 \text{ and} \\ & \text{(4 } PBCH \text{ antenna ports)} \end{cases}$$
$$m = 0, 1$$
Guard-band
$$k = 6 \cdot m + (6 - l + v_{shift}) \bmod 6$$
$$l = 0, 1, 2, 3, 4, 5, 6$$
$$m = 0, 1$$

$$a_{k,l}^{(p)} = r_{l,n_s}(m') \quad \text{[Equation 8]}$$
In-band
$$k = 6 \cdot m + (5 - l + v_{shift}) \bmod 6$$
$$l = \begin{cases} 4, 5 & \text{if } n_s \bmod 2 = 0 \\ 1, 2, 4, 5 & \text{if } n_s \bmod 2 = 1 \text{ and} \\ & \text{(1 or 2 } PBCH \text{ antenna ports)} \\ 2, 4, 5 & \text{if } n_s \bmod 2 = 1 \text{ and} \\ & \text{(4 } PBCH \text{ antenna ports)} \end{cases}$$
$$m = 0, 1$$
$$m' = m + 2 \cdot n_{NPRB}$$
Guard-band
$$k = 6 \cdot m + (5 - l + v_{shift}) \bmod 6$$
$$l = 0, 1, 2, 3, 4, 5$$
$$m = 0, 1$$
$$m' = m + 2 \cdot n_{NPRB}$$

$$a_{k,l}^{(p)} = r_{l,n_s}(m) \quad \text{[Equation 9]}$$
In-band
$$k = 6 \cdot m + (5 - l + v_{shift}) \bmod 6$$
$$l = \begin{cases} 4, 5 & \text{if } n_s \bmod 2 = 0 \\ 1, 2, 4, 5 & \text{if } n_s \bmod 2 = 1 \text{ and} \\ & \text{(1 or 2 } PBCH \text{ antenna ports)} \\ 2, 4, 5 & \text{if } n_s \bmod 2 = 1 \text{ and} \\ & \text{(4 } PBCH \text{ antenna ports)} \end{cases}$$
$$m = 0, 1$$
Guard-band
$$k = 6 \cdot m + (5 - l + v_{shift}) \bmod 6$$
$$l = 0, 1, 2, 3, 4, 5$$
$$m = 0, 1$$

In the examples of Equations 6-9, $v_{shift}$ may have one of 6 values, $\{0, 1, 2, 3, 4, 5\}$.

In Equations 6 and 8, $n_{NPRB}$ denotes the PRB index of the PRB used for NB-PRS transmission in an NB-IoT environment.

Equations 7 and 9 correspond to mathematical expressions for RE patterns in FIGS. 12A-13C when a UE is not aware of the value of $n_{NPRB}$.

The generation of an NB-PRS sequence according to the present invention will be described in detail with reference to Equations 10-12.

When an RE pattern in an NB-PRS transmission subframe according to Equations 6 and 8 is used, an NB-PRS sequence may be generated according to Equations 10 and 12. That is, the NB-PRS sequence may be generated using the Gold-sequence-based pseudo-random sequence generator in Equation 10. The pseudo-random sequence generator may be initialized to $c_{init}$ at the start of each OFDM symbol as shown in Equation 12. In this instance, a UE may generate sequences based on the maximum number of downlink resource blocks, and out of the generated sequences, only a sequence that corresponds to the location of a resource block ($n_{NPRB}$) to which an NB-PRS is mapped may be actually mapped to REs.

When an RE pattern in an NB-PRS transmission subframe according to Equations 7 and 9 is used, an NB-PRS sequence may be generated according to Equations 11 and 12. That is, the NB-PRS sequence may be generated using the Gold-sequence-based pseudo-random sequence generator in Equation 11. The pseudo-random sequence generator may be initialized to $c_{init}$ at the start of each OFDM symbol as shown in Equation 12. In this instance, a UE may not need to generate a sequence based on the maximum number of downlink resource blocks, but may instead generate a sequence based on the single resource block to which an NB-PRS is mapped and map the sequences to REs of the single resource block.

$$r_{l,n_s}(m) = \frac{1}{\sqrt{2}}(1-2\cdot c(2m)) + j\frac{1}{\sqrt{2}}(1-2\cdot c(2m+1)),$$
$$m = 0, 1, \ldots, 2N_{RB}^{max,DL} - 1$$
[Equation 10]

$$r_{l,n_s}(m) = \frac{1}{\sqrt{2}}(1-2\cdot c(2m)) + j\frac{1}{\sqrt{2}}(1-2\cdot c(2m+1)),$$
$$m = 0, 1$$
[Equation 11]

$$c_{init} = 2^{10} \cdot (7\cdot(n_s+1)+l+1)\cdot(2\cdot N_{ID}^{cell}+1)+2\cdot N_{ID}^{cell}+N_{CP}$$
$$N_{CP} = \begin{cases} 1 & \text{for normal } CP \\ 0 & \text{for extended } CP \end{cases}$$
[Equation 12]

An NB-PRS transmission PRB may be configured as follows.

The NB-PRS transmission PRB may be a single PRB configured for NB-IoT communication. Here, the single PRB index may be $n_{NPRB}$.

The NB-PRS transmission PRB may be one of the LTE PRS transmission PRBs. In this instance, one of the LTE PRS transmission PRBs may be used for NB-PRS transmission. That is, a single PRB may be used for both LTE PRS and NB-PRS transmission, at the same time. In particular, an LTE PRS and an NB-PRS are generated in the same sequence generation scheme and are mapped onto the same location; thus, a PRS sequence transmitted in an NB-PRS transmission PRB (i.e., one of the LTE PRS transmission PRBs) may be used for an LTE PRS, and may also be used for an NB-PRS.

Alternatively, the NB-PRS transmission PRB may be one of the PRBs remaining after excluding LTE PRS transmission PRBs. That is, the LTE PRS transmission PRB and the NB-PRS transmission PRB may be distinguished based on the Frequency Division Multiplexing (FDM) scheme. In this instance, the LTE PRS transmission PRB is located in the middle of a downlink system bandwidth; thus, the NB-PRS transmission PRB may be located in either the low frequency side of the downlink system bandwidth or on the edge of a high frequency side.

Next, an NB-PRS transmission subframe configuration according to the present invention will be described in detail.

As described above, in the case of an LTE PRS transmission, an LTE PRS is transmitted in $N_{PRS}$ consecutive downlink subframes. Here, $N_{PRS}$ may be set to one of the values in the set {1, 2, 4, 6}. In the case of LTE PRS transmission, a plurality of PRBs out of 6, 15, 25, 50, 75, 100 PRBs, ..., and the like may be used according to the system bandwidth.

An NB-PRS is transmitted only in a PRB that is limited in the frequency axis (i.e., a single PRB), and thus a larger number of subframes may be used for transmitting an NB-PRS when compared to an LTE PRS, to secure positioning performance. Next, examples of the present invention associated with an NB-PRS transmission subframe configuration as outlined above will be described.

Figure 14:
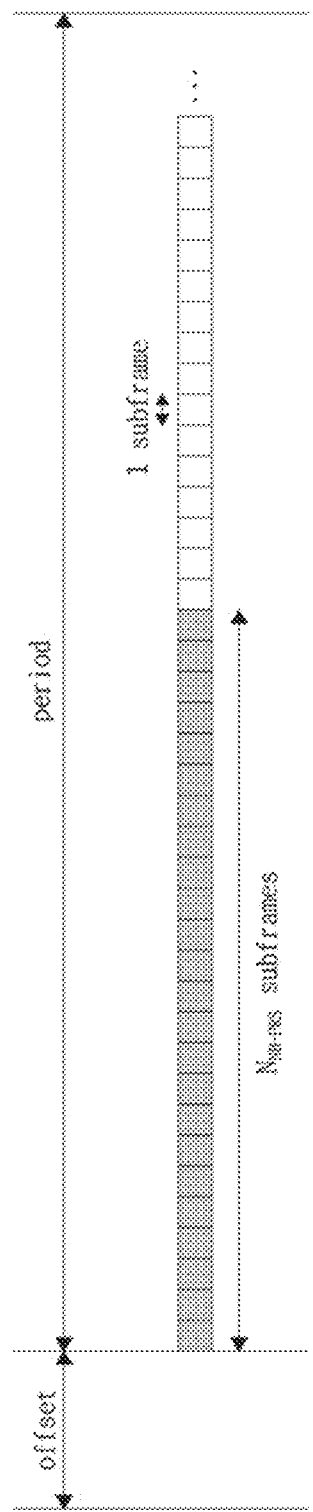
FIGS. 14-21 are diagrams illustrating an NB-PRS transmission subframe configuration.

FIG. 14 is a diagram illustrating an NB-PRS transmission subframe configuration according to an embodiment of the present invention.

$N_{NB-PRS}$ consecutive downlink subframes may not be used for an NB-PRS transmission, as illustrated in FIG. 14.

To configure NB-PRS transmission subframes, an offset for NB-PRS transmission (i.e., an NB-PRS offset, or simply an offset in FIGS. 14-20) and a period of NB-PRS transmission (i.e. an NB-PRS period, or simply a period in FIGS. 14-20) may be provided to a UE. For example, NB-PRS transmission subframes are determined by the period length of an NB-PRS from a subframe that is an NB-PRS offset distant from a predetermined reference point (e.g., a radio frame corresponding to SFN 0).

In the example shown in FIG. 14, an NB-PRS may be transmitted in $N_{NB-PRS}$ consecutive downlink subframes from a subframe determined by the NB-PRS offset and the NB-PRS period. That is, the start of the $N_{NB-PRS}$ consecutive downlink subframes may be the start of each NB-PRS period after the NB-PRS offset.

Therefore, the first subframe of each period (NB-PRS period) in which an NB-PRS is transmitted (i.e., a first subframe out of $N_{NB-PRS}$ subframes) may be the first subframe corresponding to a point where each period begins.

In this instance, the value of $N_{NB-PRS}$ may be provided to a UE through higher layer signaling. The set of candidate values for $N_{NB-PRS}$ includes {1, 2, 4, 6}, and may also include values greater than 6. For example, although the set of candidate values for $N_{NB-PRS}$ may be defined as {1, 2, 4, 6, 12, 16, 24, 36}, the set may not be limited thereto, and may include one or more values greater than the candidate values.

Figure 15:
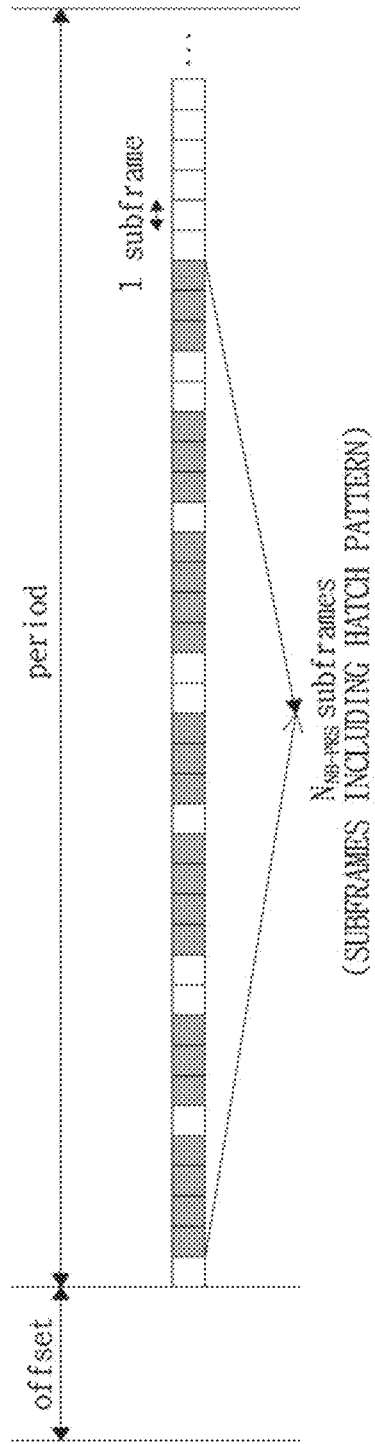

FIG. 15 is a diagram illustrating an NB-PRS transmission subframe configuration according to another embodiment of the present invention.

According to the example shown in FIG. 15, $N_{NB-PRS}$ consecutive downlink subframes that were obtained by counting subframes excluding predetermined subframes (or NB-PRS non-transmission subframes) may be used for NB-PRS transmission.

As illustrated in FIG. 15, when it is assumed that subframes that do not include a hatch pattern correspond to the predetermined subframes (or NB-PRS non-transmission subframes), and when it is assumed that subframes (i.e., subframes including a hatch pattern) excluding the predetermined subframes (or NB-PRS non-transmission subframes) are consecutively arranged, $N_{NB-PRS}$ consecutive subframes (e.g., 24 consecutive subframes) out of the subframes may be configured as NB-PRS transmission subframes.

That is, the start of the $N_{NB-PRS}$ consecutive downlink subframes may be the start of each NB-PRS period after an NB-PRS offset. When the subframe(s) in the start of the NB-PRS period corresponds to the predetermined subframe (i.e. NB-PRS non-transmission subframe), $N_{NB-PRS}$ subframes may be configured from a subframe remaining after excluding the predetermined subframe(s).

Therefore, the first subframe of each period (NB-PRS period) in which an NB-PRS is transmitted (i.e., the first subframe out of $N_{NB-PRS}$ subframes) may be the first subframe after the predetermined subframe(s) (or NB-PRS non-transmission subframe(s)) from a point where each period begins.

Here, the predetermined subframe(s) (or the NB-PRS non-transmission subframe(s)) may be defined in advance. In this instance, it is assumed that a UE is aware of the predetermined subframe (or is aware of the NB-PRS non-transmission subframe) based on a previously defined rule or on information indicated by signaling, and thus information indicating the predetermined subframe (or the NB-PRS non-transmission subframe) may not need to be signaled to the UE. However, the scope of the present invention does not exclude providing information indicating the predetermined subframe (or the NB-PRS non-transmission subframe) separately to a UE.

For example, the predetermined subframe (or the NB-PRS non-transmission subframe) may be defined as a subframe in which one or more of a Narrowband Physical Broadcast Channel (NPBCH), a Narrowband Primary Synchronization Signal (NPSS), and a Narrowband Secondary Synchronization Signal (NSSS) are transmitted. This is to prevent a collision between an NB-PRS and an NPBCH, NPSS, or NSSS. That is, an NPBCH that transmits important system information such as Master Information Block or the like and an NPSS/NSSS for synchronization are given a higher priority than that of an NB-PRS, so that the NB-PRS is not transmitted in a subframe in which one or more out of the NPBCH, the NPSS, and the NSSS are transmitted. Most REs are used for the NPBCH, the NPSS, or the NSSS in the subframe in which one or more of the NPBCH, the NPSS, and the NSSS are transmitted. Few physical resources onto which other physical channels or physical signals, such as an NB-PRS, are to be mapped, exist in the subframe. The scope of the present invention is not limited by a scheme of defining the predetermined subframe (or the NB-PRS non-transmission subframe) as a subframe in which one or more of the NPBCH, NPSS, and NSSS are transmitted. The scope of the present invention includes a scheme of excluding a subframe in which a predetermined physical channel or physical signal is transmitted from NB-PRS transmission subframes (i.e., a scheme of configuring the subframe as an NB-PRS non-transmission subframe).

As another example, NB-IoT downlink subframes for transmitting a control channel (e.g., Narrowband Physical Downlink Control Channel) and a Narrowband Physical Downlink Shared Channel (NPDSCH) in an NB-IoT environment may be excluded from an NB-PRS transmission subframe. This also applies to the case that gives priority to control channel and data channel transmission over NB-PRS transmission in an NB-IoT environment. In this NB-IoT environment, some subframes out of any invalid downlink subframes may be used for transmitting an NB-PRS. In this instance, invalid downlink subframes are subframes remaining after excluding the NB-IoT downlink subframes used for transmitting a control channel and a data channel.

The predetermined subframe (or the NB-PRS non-transmission subframe) may be defined as a subframe(s) corresponding to a subframe index 0, 5, and/or 9 in a radio frame. This may be defined based on the location of a subframe in which an NPBCH, NPSS, and/or NSSS is transmitted in a radio frame. However, the scope of the present invention is not limited by the subframe index 0, 5, and/or 9, and the scope of the present invention includes a scheme of excluding a subframe having a predetermined index value from NB-PRS transmission subframes.

As another concrete example, when NB-IoT downlink subframes for transmitting a control channel and a data channel in an NB-IoT environment are excluded from an NB-PRS transmission subframe, information associated with the excluded NB-IoT downlink subframes may comply with valid downlink subframe configuration information defined in advance in the NB-IoT environment. The valid downlink subframe configuration information may be included in a "DL-Bitmap-NB-r13" signaling field and may be transmitted through higher layer signaling such as an RRC or the like. The signaling field may be a bitmap having a length of 10 or 40. Based on whether a bit value is "1" or "0" in the bitmap, the system determines whether a downlink subframe is a valid downlink subframe or invalid downlink subframe. Some invalid downlink subframes may be used for transmitting an NB-PRS. In addition, the predetermined subframe (or NB-PRS non-transmission subframe) may be defined as an uplink subframe and a special subframe determined by a TDD configuration. That is, in a TDD system, NB-PRS transmission subframes include a downlink subframe.

In this instance, the value of $N_{NB\text{-}PRS}$ may be provided to a UE through higher layer signaling. The set of candidate values for $N_{NB\text{-}PRS}$ may include $\{1, 2, 4, 6\}$, and may further include one or more values greater than 6. For example, although the set of candidate values for $N_{NB\text{-}PRS}$ may be defined as $\{1, 2, 4, 6, 12, 16, 24, 36\}$, this may not be limited thereto, and may further include one or more values greater than the candidate values.

Figure 16:
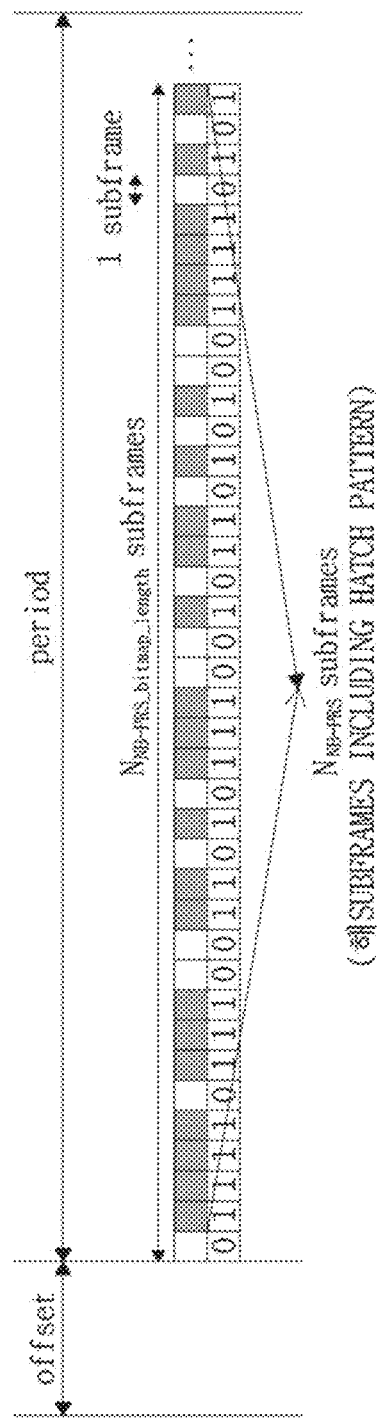

FIG. 16 is a diagram illustrating an NB-PRS transmission subframe configuration according to another embodiment of the present invention.

According to the example shown in FIG. 16, in a duration composed of $N_{NB\text{-}PRS\_bitmap\_length}$ subframes, the number of NB-PRS transmission subframes (i.e., $N_{NB\text{-}PRS}$) and the locations thereof may be provided to a UE using a bitmap scheme.

The duration composed of $N_{NB\text{-}PRS\_bitmap\_length}$ subframes begins from the start of every NB-PRS period after an NB-PRS offset.

Therefore, the first subframe of each period (NB-PRS period) in which an NB-PRS is transmitted (i.e., a first subframe out of $N_{NB\text{-}PRS}$ subframes) is a first subframe, which corresponds to a bit value of "1" in the bitmap, from the point where each period begins.

Here, the value of $N_{NB\text{-}PRS\_bitmap\_length}$ may be a value defined in advance as follows. In this instance, it is assumed that a UE is already aware of the value of $N_{NB\text{-}PRS\_bitmap\_length}$, and thus, information indicating the value of $N_{NB\text{-}PRS\_bitmap\_length}$ may not need to be signaled to the UE. However, the scope of the present invention does not exclude providing the information indicating the value of $N_{NB\text{-}PRS\_bitmap\_length}$ to the UE.

For example, in FDD and TDD UL-DL configuration 1 to 5, the value of $N_{NB\text{-}PRS\_bitmap\_length}$ may be defined as 40 (i.e., 40 subframes (40 ms)) in advance. In TDD UL-DL configuration 6, the value of $N_{NB\text{-}PRS\_bitmap\_length}$ may be defined as 60 (i.e., 60 subframes (60 ms)) in advance. In TDD UL-DL configuration 0, the value of $N_{NB\text{-}PRS\_bitmap\_length}$ may be defined as 70 (i.e., 70 subframes (70 ms)) in advance. Alternatively, in all cases, the value of $N_{NB\text{-}PRS\_bitmap\_length}$ may be defined as 40 (i.e., 40 subframes (40 ms)) or 80 (i.e., 80 subframes (80 ms)) in advance, irrespective of an FDD and TDD UL-DL configuration.

Alternatively, a plurality of candidate values for $N_{NB\text{-}PRS\_bitmap\_length}$ may be defined in advance, and information indicating a value to be applied out of the plurality of candidate values may be reported to a UE through higher layer signaling.

For example, in FDD and TDD UL-DL configurations 1-5, the candidate values for $N_{NB\text{-}PRS\_bitmap\_length}$ may be defined in advance as 40, 80, 120, and 160; one of the candidate values may then be indicated to a UE. In TDD UL-DL configuration 6, the candidate values for $N_{NB\text{-}PRS\_bitmap\_length}$ may be defined in advance as 60, 120, 180, and 240; one of the candidate values may then be indicated to a UE. In TDD UL-DL configuration 0, the candidate values for $N_{NB\text{-}PRS\_bitmap\_length}$ may be defined in advance as 70, 140, 210, and 280; one of the candidate values may then be indicated to a UE. In all cases, the candidate values for $N_{NB\text{-}PRS\_bitmap\_length}$ may be defined in advance as 40, 80, 120, and 160 irrespective of an FDD and TDD UL-DL configuration, and one of the candidate values may then be indicated to a UE.

In the examples described above, the scope of the present invention is not limited to a predetermined value of $N_{NB\text{-}PRS\_bitmap\_length}$, and another value defined in advance may be applied.

Figure 17:
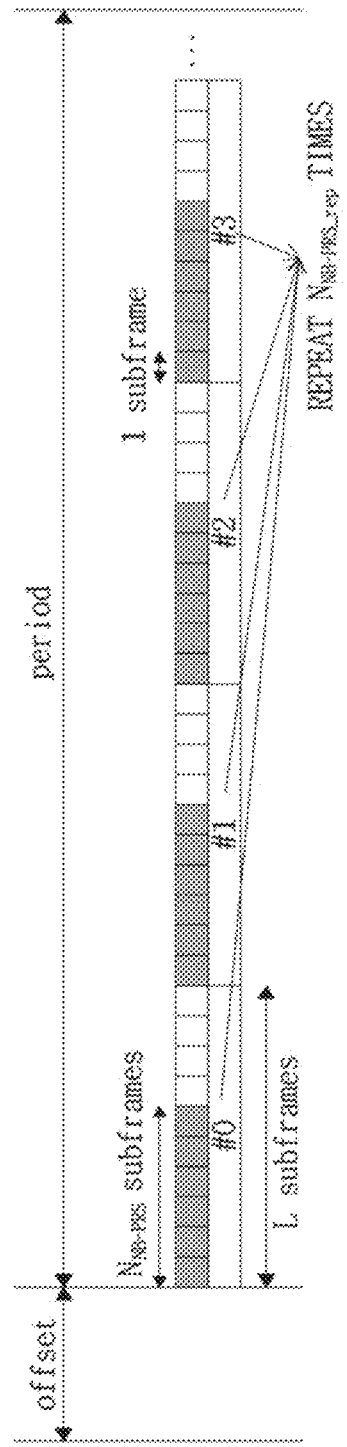

In the example shown in FIG. 16, the number of NB-PRS transmission subframes and the locations thereof are indicated using a bitmap, and thus the value of $N_{NB\text{-}PRS}$ may not be separately provided to a UE. However, the maximum value of $N_{NB\text{-}PRS}$ is defined as a value less than or equal to the value of $N_{NB\text{-}PRS\_bitmap\_length}$. FIG. 17 is a diagram illustrating an NB-PRS transmission subframe configuration according to another embodiment of the present invention.

In the example shown in FIG. 17, $N_{NB}$-PRS consecutive downlink subframes in a predetermined duration composed of L subframes are defined as NB-PRS transmission subframes. The NB-PRS transmission subframes in a single NB-PRS period may be defined by repeating the predetermined duration composed of L subframes $N_{NB\text{-}PRS\_rep}$ times.

A duration in which the predetermined duration composed of L subframes is repeated $N_{NB\text{-}PRS\_rep}$ times, begins from the start of every NB-PRS period after an NB-PRS offset.

Therefore, in the predetermined duration composed of L subframes, the first subframe (i.e., a first subframe from among $N_{NB\text{-}PRS}$ subframes) in which an NB-PRS is transmitted is a first subframe corresponding to a point where the predetermined duration composed of L subframes starts.

Here, L may have a value defined in advance. For example, L may be defined as 10 (L=10), that is, a single radio frame duration. In this instance, it is assumed that a UE is already aware of the value of L, and thus information indicating the value of L may not need to be signaled to the UE. However, the scope of the present invention does not exclude signaling the value of L to the UE.

The value of $N_{NB\text{-}PRS\_rep}$ may be signaled to the UE. For example, candidate values for $N_{NB\text{-}PRS\_rep}$ may be defined as values greater than or equal to 1 and less than or equal to the maximum value. One of the candidate values may be provided to the UE through higher layer signaling. The maximum value of $N_{NB\text{-}PRS\_rep}$ may be determined by L and the value of an NB-PRS period. That is, the value of $N_{NB\text{-}PRS\_rep}$ may be determined to satisfy the condition that the value of $L*N_{NB\text{-}PRS\_rep}$ is less than or equal to the NB-PRS period. For example, the set of candidate values for $N_{NB\text{-}PRS\_rep}$ may include {1, 2, 4, 6}, and may further include one or more values greater than 6. Alternatively, the value of $N_{NB\text{-}PRS\_rep}$ may be fixed to one of the candidate values (in other words, the value may be set as a value that the UE is already aware of, without separately being signaled to the UE).

In this instance, the value of $N_{NB\text{-}PRS}$ may be provided to the UE through higher layer signaling. The set of the candidate values for $N_{NB\text{-}PRS}$ may be {1, 2, 4, 6}. However, the present invention is not limited thereto, and may further include one or more values greater than the candidate values. Alternatively, the value of $N_{NB\text{-}PRS}$ may be fixed to one of the candidate values (in other words, the value may be set as a value that the UE is already aware of, without separately being signaled to the UE).

Figure 18:
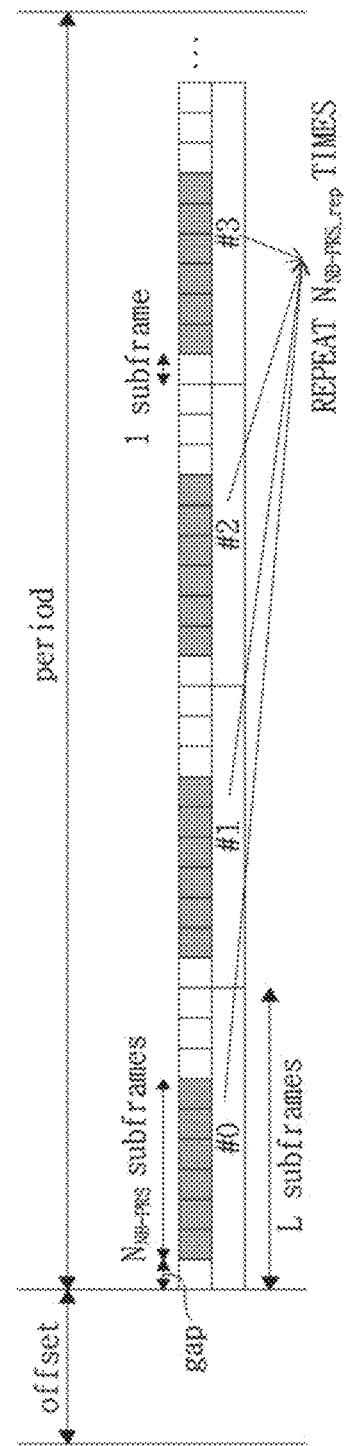

FIG. 18 is a diagram illustrating an NB-PRS transmission subframe configuration according to another embodiment of the present invention.

In the example shown in FIG. 18, to configure NB-PRS transmission subframes, an offset (e.g., an offset from FIG. 18) may be defined that indicates the start point of an NB-PRS period; a gap (e.g., a gap from FIG. 18) may also be defined that indicates the start point of $N_{NB\text{-}PRS}$ subframes in an L-subframe duration.

That is, the candidates for NB-PRS transmission subframes may be set by both a predetermined duration composed of L subframes and $N_{NB\text{-}PRS\_rep}$, which indicates the number of times that the predetermined duration is repeated as described in the example shown in FIG. 17. The example shown in FIG. 17 illustrates that $N_{NB\text{-}PRS}$ consecutive subframes start from a first subframe in the L-subframe duration. The example shown in FIG. 18 illustrates that $N_{NB\text{-}PRS}$ consecutive subframes start from an $n^{th}$ subframe in the L-subframe duration. That is, the example of FIG. 17 corresponds to the case in which gap=0 in the example of FIG. 18.

Also, in the predetermined duration composed of L subframes, the first subframe (i.e., the first subframe from among $N_{NB\text{-}PRS}$ subframes) in which an NB-PRS is transmitted may be the first subframe after the gap from a point where the predetermined duration composed of L subframes starts.

Other features shown in FIG. 18 are the same as the descriptions which have been provided for FIG. 17, and thus detailed descriptions thereof will be omitted.

Figure 19:
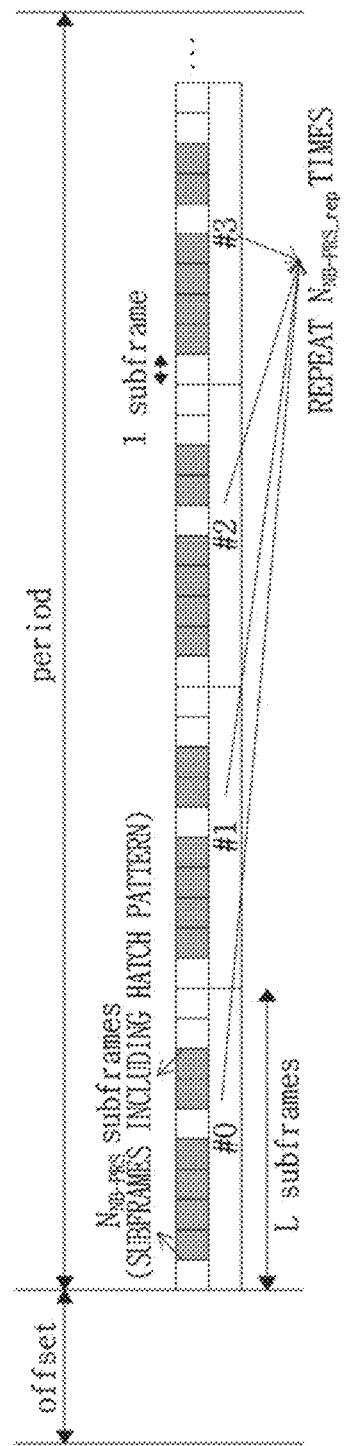

FIG. 19 is a diagram illustrating an NB-PRS transmission subframe configuration according to another embodiment of the present invention.

According to the example shown in FIG. 19, $N_{NB\text{-}PRS}$ consecutive downlink subframes, identified by counting subframes remaining after excluding predetermined subframes (or NB-PRS non-transmission subframes) in a predetermined duration composed of L subframes, may be set as NB-PRS transmission subframes. NB-PRS transmission subframes in a single NB-PRS period may be set by repeating the predetermined duration composed of L subframes $N_{NB\text{-}PRS\_rep}$ times.

As illustrated in FIG. 19, when it is assumed that subframes that do not include a hatch pattern correspond to the predetermined subframes (or NB-PRS non-transmission subframes), and subframes (i.e., subframes including a hatch pattern) excluding the predetermined subframes (or NB-PRS non-transmission subframes) in the predetermined duration composed of L subframes are consecutively arranged, $N_{NB\text{-}PRS}$ consecutive subframes (e.g., 6 consecutive subframes) of the consecutively arranged subframes may be configured as NB-PRS transmission subframes.

A duration in which the predetermined duration composed of L subframes is repeated $N_{NB\text{-}PRS\_rep}$ times begins from the start of every NB-PRS period after an NB-PRS offset. When the subframe(s) in the start of the predetermined duration composed of L subframes correspond to the predetermined subframes (i.e. the NB-PRS non-transmission subframes), $N_{NB\text{-}PRS}$ consecutive subframes may be configured from a subframe remaining after excluding the predetermined subframe(s).

Therefore, in the predetermined duration composed of L subframes, the first subframe (i.e., the first subframe from among $N_{NB\text{-}PRS}$ subframes) in which an NB-PRS is transmitted may be the first subframe after the predetermined subframe(s) (i.e. the NB-PRS non-transmission subframe(s)). from the first subframe corresponds to a point where the predetermined duration composed of L subframes starts.

Here, the predetermined subframe(s) (or the NB-PRS non-transmission subframe(s)) may be defined in advance. In this instance, it is assumed that a UE is already aware of the predetermined subframe (or the NB-PRS non-transmission subframe) based on a previously defined rule or on information indicated in advance through signaling, and thus information indicating the predetermined subframe (or the NB-PRS non-transmission subframe) may not need to be signaled to the UE. However, the scope of the present invention does not exclude transmitting information indicating the predetermined subframe (or the NB-PRS non-transmission subframe) to the UE.

For example, the predetermined subframe (or the NB-PRS non-transmission subframe) may be defined as a subframe in which one or more of a Narrowband Physical Broadcast Channel (NPBCH), a Narrowband Primary Synchronization Signal (NPSS), and a Narrowband Secondary Synchronization Signal (NSSS) are transmitted. This is to prevent a collision between an NB-PRS and an NPBCH, NPSS, or NSSS. That is, an NPBCH that transmits important system information (such as Master Information Block or the like) and that transmits an NPSS/NSSS for synchronization is given a higher priority status than an NB-PRS will have, so that the NB-PRS is not transmitted in a subframe in which one or more of the NPBCH, the NPSS, and the NSSS are transmitted. Most REs are used for the NPBCH, the NPSS, or the NSSS in a subframe in which one or more of the NPBCH, the NPSS, and the NSSS are transmitted. Few physical resources onto which other physical channels or physical signals, such as an NB-PRS, are to be mapped, exist in that subframe.

The scope of the present invention is not limited to a scheme of defining the predetermined subframe (or the NB-PRS non-transmission subframe) as a subframe in which one or more of the NPBCH, NPSS, and NSSS are transmitted. The scope of the present invention includes a scheme of excluding a subframe in which a predetermined physical channel or physical signal is transmitted from an NB-PRS transmission subframe (i.e., a scheme of configuring the subframe as an NB-PRS non-transmission subframe).

As another example, NB-IoT downlink subframes for transmitting a control channel (e.g., Narrowband Physical Downlink Control Channel) and a Narrowband Physical Downlink Shared Channel (NPDSCH) in an NB-IoT environment may be excluded from an NB-PRS transmission subframe. This example also takes into account a case that gives priority to control channel and data channel transmission over NB-PRS transmission in an NB-IoT. environment In an NB-IoT system, some invalid downlink subframes may be used for transmitting an NB-PRS. These invalid downlink subframes are those subframes remaining after excluding NB-IoT downlink subframes for transmitting a control channel and a data channel.

In particular, the predetermined subframe (or the NB-PRS non-transmission subframe) may be defined as subframe(s) corresponding to a subframe index 0, 5, and/or 9 in a radio frame. This may be defined accounting for the location of a subframe in which an NPBCH, NPSS, and/or NSSS is transmitted in a radio frame. However, the scope of the present invention is not limited by the subframe index 0, 5, and/or 9, and the scope of the present invention includes a scheme of excluding a subframe having a predetermined index value from NB-PRS transmission subframes.

As another concrete example, when NB-IoT downlink subframes for transmitting a control channel and a data channel in an NB-IoT environment are excluded from an NB-PRS transmission subframe, information associated with the excluded NB-IoT downlink subframes may comply with valid downlink subframe configuration information defined in advance in the NB-IoT system. The valid downlink subframe configuration information may be included in a "DL-Bitmap-NB-r13" signaling field and may be transmitted through higher layer signaling such as an RRC or the like. The signaling field may be a bitmap having a length of 10 or 40. Based on whether a bit value is "1" or "0" in the bitmap, the system determines whether a downlink subframe is a valid downlink subframe or an invalid downlink subframe. Some invalid downlink subframes may be used for transmitting an NB-PRS.

In addition, the predetermined subframes (i.e. the NB-PRS non-transmission subframe) may be an uplink subframe and a special subframe determined by a TDD configuration. That is, in a TDD system, it may be defined that NB-PRS transmission subframes include a downlink subframe.

Here, the value of L may be a value defined in advance. For example, L may be defined, in advance, as 10 (L=10), that is, as a single radio frame duration. In this instance, it is assumed that a UE is already aware of the value of L, and thus, information indicating the value of L may not need to be signaled to the UE. However, the scope of the present invention does not exclude signaling the value of L to the UE.

The value of $N_{NB-PRS\_rep}$ may be signaled to the UE. For example, candidate values for $N_{NB-PRS\_rep}$ may be defined as values greater than or equal to 1 and less than or equal to the maximum value. One of the candidate values may be provided to the UE through higher layer signaling. The maximum value of $N_{NB-PRS\_rep}$ may be determined by L and by the value of an NB-PRS period. That is, the value of $N_{NB-PRS\_rep}$ may be determined to satisfy the condition that the value of $L*N_{NB-PRS\_rep}$ is less than or equal to the NB-PRS period. For example, the set of candidate values for $N_{NB-PRS\_rep}$ may include {1, 2, 4, 6}, and may further include one or more values greater than 6. Alternatively, the value of $N_{NB-PRS\_rep}$ may be fixed to one of the candidate values (i.e., the value may be defined as a value that the UE is already aware of, without separately being signaled to the UE).

In this instance, the value of $N_{NB-PRS}$ may be transmitted to the UE through higher layer signaling. The set of the candidate values for $N_{NB-PRS}$ may be {1, 2, 4, 6}. However, the present invention is not limited thereto, and may further include one or more values greater than the candidate values. Alternatively, the value of $N_{NB-PRS}$ may be fixed to one of the candidate values (i.e., the value may be defined as a value that the UE is already aware of, without separately being signaled to the UE).

Figure 20:
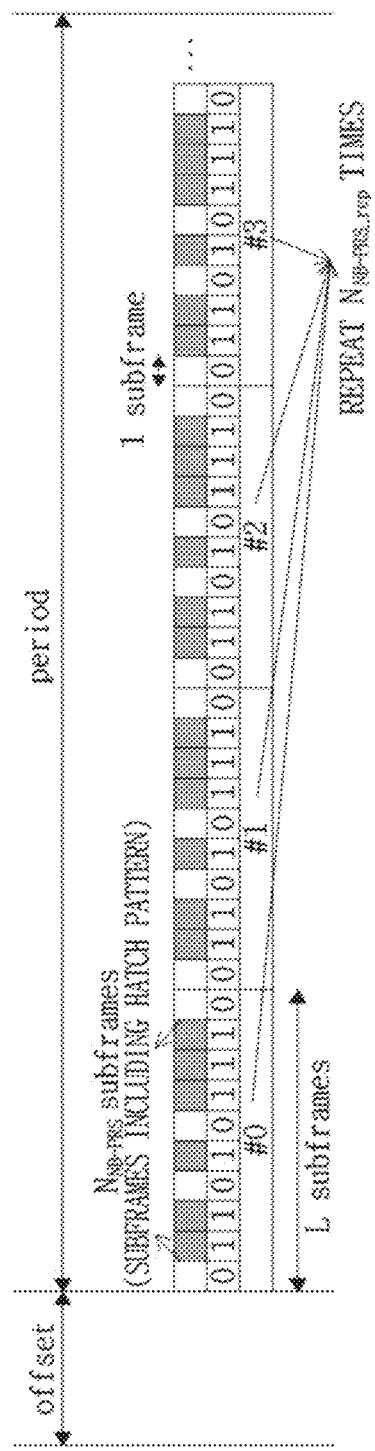

FIG. 20 is a diagram illustrating an NB-PRS transmission subframe configuration according to another embodiment of the present invention.

In the example shown in FIG. 20, the number of NB-PRS transmission subframes (i.e., $N_{NB-PRS}$) and the locations thereof in a predetermined duration composed of L subframes may be determined using a bitmap. NB-PRS transmission subframes in a single NB-PRS period may be defined by repeating the predetermined duration composed of L subframes $N_{NB-PRS\_rep}$ times.

A duration in which the predetermined duration composed of L subframes is repeated $N_{NB-PRS\_rep}$ times begins from the start of every NB-PRS period after an NB-PRS offset.

Therefore, in the predetermined duration composed of L subframes, the first subframe (i.e., the first subframe from among $N_{NB-PRS}$ subframes) in which an NB-PRS is transmitted may be a first subframe corresponding to a bit value of "1" in the bitmap from a point where the predetermined duration composed of L subframes starts.

Here, the value of L may be a value defined in advance. For example, L may be defined, in advance, as 10 (L=10), that is, a single radio frame duration. In this instance, it is assumed that a UE is already aware of the value of L, and thus, information indicating the value of L may not need to be signaled to the UE. However, the scope of the present invention does not exclude signaling the value of L to the UE.

The value of $N_{NB\text{-}PRS\_rep}$ may be signaled to the UE. For example, candidate values for $N_{NB\text{-}PRS\_rep}$ may be defined as values greater than or equal to 1 and less than or equal to the maximum value. One of the candidate values may be provided to the UE through higher layer signaling. The maximum value of $N_{NB\text{-}PRS\_rep}$ may be determined by L and by the value of an NB-PRS period. That is, the value of $N_{NB\text{-}PRS\_rep}$ may be determined to satisfy that the value of $L*N_{NB\text{-}PRS\_rep}$ is less than or equal to the NB-PRS period. For example, the set of candidate values for $N_{NB\text{-}PRS\_rep}$ may include {1, 2, 4, 6}, and may further include one or more values greater than 6. Alternatively, the value of $N_{NB\text{-}PRS\_rep}$ may be fixed to one of the candidate values (i.e., the value may be defined as a value that the UE is already aware of, without separately being signaled to the UE).

In the example of FIG. 20, the number of NB-PRS transmission subframes and the locations thereof are indicated using a bitmap, and thus the value of $N_{NB\text{-}PRS}$ may not be separately provided to the UE. However, the maximum value of $N_{NB\text{-}PRS}$ may be defined as a value less than or equal to the value of L.

Figure 21:
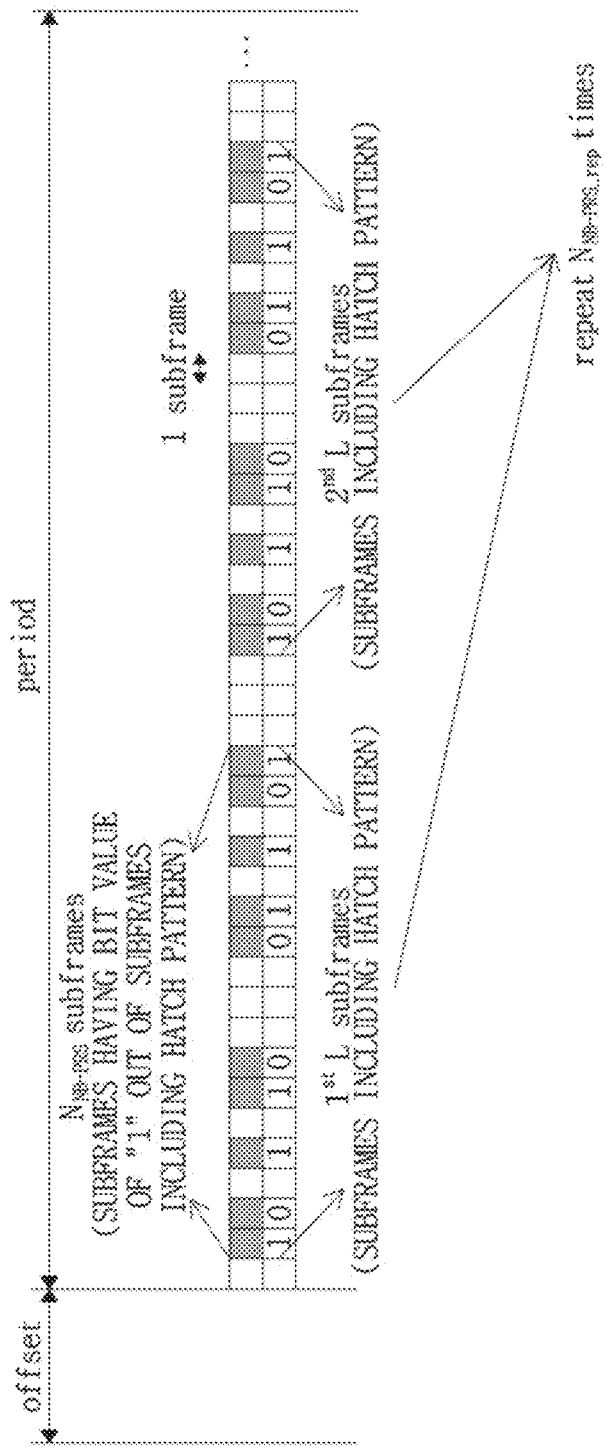

FIG. 21 is a diagram illustrating an NB-PRS transmission subframe configuration according to another embodiment of the present invention.

According to an example of FIG. 21, one or more predetermined durations, each composed of L subframes, are defined for the subframes remaining after excluding a predetermined subframe (i.e. the NB-PRS non-transmission subframe) from the entire set of subframes. The number of NB-PRS transmission subframes (i.e., $N_{NB\text{-}PRS}$) and the locations thereof are determined based on a bitmap scheme within a predetermined duration composed of L subframes. NB-PRS transmission subframes within a single NB-PRS period may be determined by repeating the predetermined duration composed of L subframes $N_{NB\text{-}PRS\_rep}$ times.

As illustrated in FIG. 21, when it is assumed that subframes that do not include a hatch pattern correspond to the predetermined subframes (i.e. the NB-PRS non-transmission subframes), the number of NB-PRS transmission subframes (i.e., $N_{NB\text{-}PRS}$) and the locations thereof are determined based on a bitmap scheme within a predetermined duration composed of L subframes out of the set of subframes (i.e., subframes including a hatch pattern) remaining after excluding the predetermined subframes (or NB-PRS non-transmission subframes). NB-PRS transmission subframes within a single NB-PRS period may be determined by repeating the predetermined duration composed of L subframes $N_{NB\text{-}PRS\_rep}$ times.

A duration in which the predetermined duration composed of L subframes is repeated $N_{NB\text{-}PRS\_rep}$ times, begins from the start of every NB-PRS period after an NB-PRS offset. When the subframe(s) in the start of the NB-PRS period corresponds to the predetermined subframe (or NB-PRS non-transmission subframe), a duration may be configured by repeating the predetermined duration composed of L subframes $N_{NB\text{-}PRS\_rep}$ times from a subframe remaining after excluding the predetermined subframe(s).

Therefore, the first subframe in which an NB-PRS is transmitted in each period (NB-PRS period) (i.e., the first subframe out of $N_{NB\text{-}PRS}$ subframes) may be a first subframe that corresponds to a bit value of "1" in the bitmap at the start point of the predetermined duration composed of L subframes, within the predetermined duration composed of L subframes, which starts from a first subframe after the predetermined subframes (or NB-PRS non-transmission subframes) from the start point of each period.

Here, the predetermined subframe(s) (or the NB-PRS non-transmission subframe(s)) may be defined in advance. In this instance, it is assumed that a UE is already aware of the predetermined subframe (or the NB-PRS non-transmission subframe) based on a previously defined rule or on information indicated by signaling, and thus information indicating the predetermined subframe (or the NB-PRS non-transmission subframe) may not need to be signaled to the UE. However, the scope of the present invention may not exclude separately providing information indicating the predetermined subframe (or the NB-PRS non-transmission subframe) to the UE.

For example, the predetermined subframe (or the NB-PRS non-transmission subframe) may be defined as a subframe in which one or more of a Narrowband Physical Broadcast Channel (NPBCH), a Narrowband Primary Synchronization Signal (NPSS), and a Narrowband Secondary Synchronization Signal (NSSS) are transmitted. This is to prevent a collision between an NB-PRS and an NPBCH, NPSS, or NSSS. That is, an NPBCH that transmits important system information such as a Master Information Block (MIB) or the like and that an NPSS/NSSS for synchronization is given a higher priority than an NB-PRS transmission, so that the NB-PRS is not transmitted in a subframe in which one or more of the NPBCH, the NPSS, and the NSSS are transmitted. Most REs are used for the NPBCH, the NPSS, or the NSSS in the subframe in which one or more out of the NPBCH, the NPSS, and the NSSS are transmitted; few physical resources onto which other physical channels or physical signals (such as an NB-PRS) are to be mapped exist in the subframe. The scope of the present invention is not limited by a scheme of defining the predetermined subframe (or the NB-PRS non-transmission subframe) as a subframe in which one or more out of the NPBCH, NPSS, and NSSS are transmitted. The scope of the present invention includes a scheme of excluding a subframe in which a predetermined physical channel or physical signal is transmitted from an NB-PRS transmission subframe (i.e., a scheme of configuring the subframe as an NB-PRS non-transmission subframe).

As another example, NB-IoT downlink subframes for transmitting a control channel (e.g., Narrowband Physical Downlink Control Channel (NPDCCH)) and a data channel (Narrowband Physical Downlink Shared Channel (NPDSCH)) in an NB-IoT environment may be excluded from a NB-PRS transmission subframe. This also takes into account the case that gives priority to control channel and data channel transmission over NB-PRS transmission in an NB-IoT system. In such an NB-IoT system, some subframes out of invalid downlink subframes, which are the subframes remaining after excluding NB-IoT downlink subframes for transmitting a control channel and a data channel, may be used for transmitting an NB-PRS.

In particular, the predetermined subframe (or the NB-PRS non-transmission subframe) may be defined as a subframe(s) corresponding to a subframe index 0, 5, and/or 9 in a radio frame. This may be defined taking into account the location of a subframe in which an NPBCH, NPSS, and/or NSSS is transmitted in a radio frame. However, the scope of the present invention is not limited by the subframe index 0, 5, and/or 9, and the scope of the present invention includes a scheme of excluding a subframe having a predetermined index value from a NB-PRS transmission subframe.

As another concrete example, when NB-IoT downlink subframes for transmitting a control channel and a data channel in an NB-IoT environment are excluded from an NB-PRS transmission subframe, information associated with the excluded NB-IoT downlink subframes may comply with valid downlink subframe configuration information defined in advance in the NB-IoT system. The valid downlink subframe configuration information may be included in a "DL-Bitmap-NB-r13" signaling field and may be transmitted through higher layer signaling such as an RRC or the like. The signaling field may be a bitmap having a length of 10 or 40. Based on whether a bit value is "1" or "0" in the bitmap, it is determined whether a downlink subframe is a valid downlink subframe or an invalid downlink subframe. Some invalid downlink subframes may be used for transmitting an NB-PRS.

In addition, the predetermined subframes (or NB-PRS non-transmission subframe) may be an uplink subframe and a special subframe determined by a TDD configuration. That is, in a TDD system, it may be defined that an NB-PRS transmission subframe is included in the downlink subframes.

Here, the value of L may be a value defined in advance. For example, L may be defined in advance as 10 (L=10), that is, as a single radio frame duration. As another example, L may be defined in advance as a value corresponding to a multiple of 10, such as L=20 or L=40. In this instance, it is assumed that a UE is already aware of the value of L, and thus, information indicating the value of L may not need to be signaled to the UE. However, the scope of the present invention does not exclude signaling the value of L to the UE.

The value of $N_{NB-PRS\_rep}$ may be signaled to the UE. For example, candidate values for $N_{NB-PRS\_rep}$ may be defined as values greater than or equal to 1 and less than or equal to the maximum value. One of the candidate values may be provided to the UE through higher layer signaling. The maximum value of $N_{NB-PRS\_rep}$ may be determined based on the number of the predetermined subframes (or NB-PRS non-transmission subframes), the value L, and the value of an NB-PRS period. That is, the value of $N_{NB-PRS\_rep}$ may be set to satisfy the condition that the value of $L*N_{NB-PRS\_rep}$ is less than or equal to the number of subframes excluding the predetermined subframe (or NB-PRS non-transmission subframe) in the NB-PRS period. For example, the set of candidate values for $N_{NB-PRS\_rep}$ may include {1, 2, 4, 6}, and may further include one or more values greater than 6. Alternatively, the value of $N_{NB-PRS\_rep}$ may be fixed to one of the candidate values (i.e., the value may be defined as a value that the UE is already aware of, without separately being signaled to the UE).

In this instance, the value of $N_{NB-PRS}$ may be provided to the UE through higher layer signaling. The set of the candidate values for $N_{NB-PRS}$ may be {1, 2, 4, 6}. However, the present invention is not limited thereto, and may further include one or more values greater than the candidate values. Alternatively, the value of $N_{NB-PRS}$ may be fixed to one of the candidate values (i.e., the value may be defined as a value that the UE is already aware of, without separately being signaled to the UE).

In the example of FIG. 21, the number of NB-PRS transmission subframes and the locations thereof are indicated using a bitmap, and thus the value of $N_{NB-PRS}$ may not be separately provided to the UE. However, the maximum value of $N_{NB-PRS}$ may be defined as a value less than or equal to the value of L.

Figure 22:
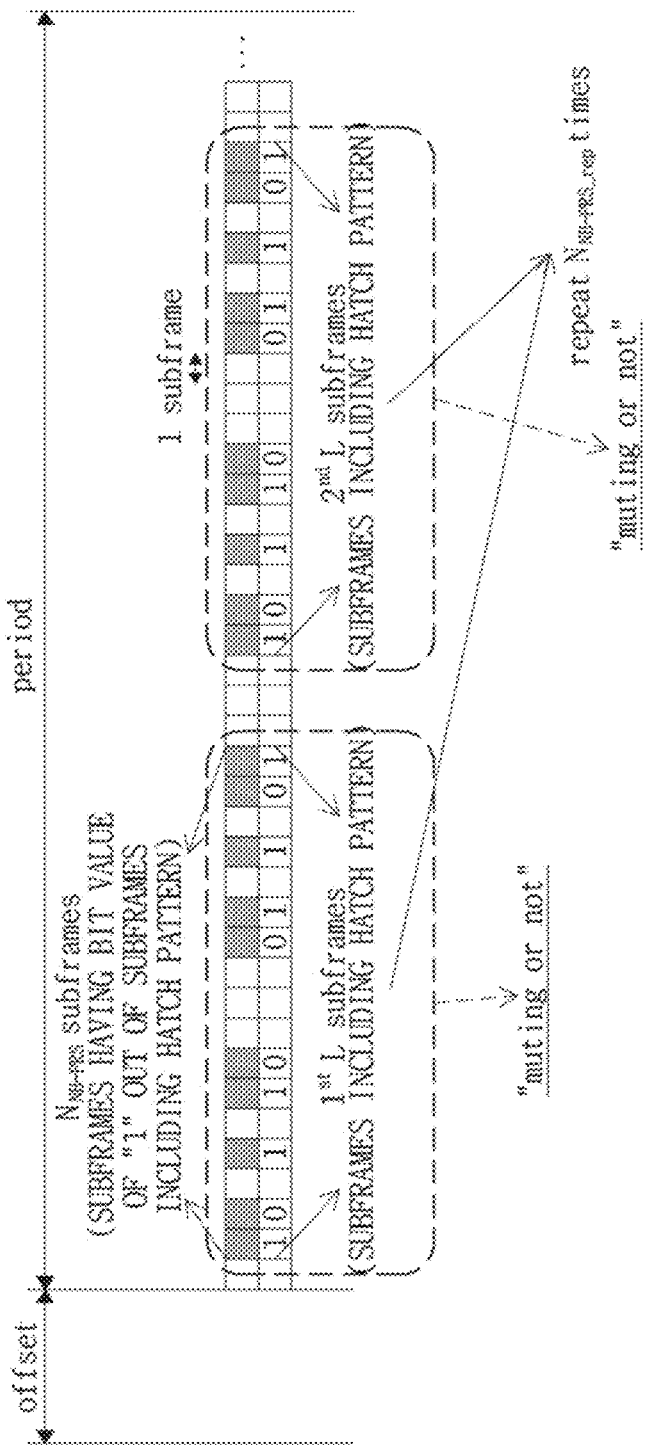
FIG. 22 is a diagram illustrating an example of applying muting to an NB-PRS transmission subframe configuration.

FIG. 22 is a diagram illustrating an example of applying muting to an NB-PRS transmission subframe configuration according to embodiments of the present invention.

To perform positioning through a PRS based on an OTDOA scheme, not all eNBs (or cells) need to transmit PRSs at a predetermined point in time. Positioning through a PRS based on the OTDOA scheme may be performed only when PRSs are received from at least three eNBs (or cells). When a large number of eNBs (or cells) transmit PRSs at the same time, the quality of PRSs from at least three eNBs (or cells), from which positions are to be measured, may deteriorate due to interference among the PRSs transmitted from the eNBs (or cells).

When a muting technology is applied, not all eNBs (or cells) transmit PRSs; instead, some eNBs (or cells) transmit PRSs and the remaining eNBs (or cells) do not transmit PRSs. In this manner, the positioning performance may be improved.

Whether or not to apply muting associated with an NB-PRS may be determined based on a PRS transmission period in the same manner as an LTE PRS. However, in the case of the NB-PRS, the number of subframes used for PRS transmission in a single PRS transmission period is far greater than that of the LTE PRS. Therefore, this may be inefficient.

As such, a unit for applying muting associated with an NB-PRS needs to be smaller than an NB-PRS period. The present invention suggests L subframes, which have been described in FIGS. 17 to 21, as a unit for applying muting associated with an NB-PRS.

Applying muting associated with an NB-PRS may be determined based on L subframes, which have been described in FIGS. 17-21.

Referring to FIGS. 17-20, whether to apply muting is determined based on a predetermined duration composed of L subframes. In the predetermined duration composed of L subframes, all of the $N_{NB-PRS}$ subframes (corresponding to subframes including a hatch pattern in the predetermined duration composed of L subframes in FIGS. 17-20) may or may not be muted.

As described in FIG. 22, in the case of FIG. 21, whether to apply muting is determined based on a predetermined duration composed of L subframes. Accordingly, all of the $N_{NB-PRS}$ subframes (subframes having a bit value of "1" from among the L subframes including a hatch pattern in FIG. 21) in a predetermined duration composed of L subframes (corresponding to subframes including a hatch pattern of FIG. 21) may or may not be muted.

A bitmap having a length of $k*N_{NB-PRS\_rep}$ may be used to indicate whether muting is to be applied, which is determined based on a predetermined duration composed of L subframes. Muting is not applied to any of the $N_{NB-PRS}$ subframes in a predetermined duration composed of L subframes where the bit value is "1" in the bitmap having a length of $k*N_{NB-PRS\_rep}$. Muting is applied to all of the $N_{NB-PRS}$ subframes in a predetermined duration composed of L subframes where the bit value of "0". Conversely, muting is not applied to any of the $N_{NB-PRS}$ subframes in a predetermined duration composed of L subframes where the bit value is "0" in the bitmap having a length of $k*N_{NB-PRS\_rep}$.

Muting is applied to all of the $N_{NB-PRS}$ subframes in a predetermined duration composed of L subframes where the bit value is "1".

Here, $N_{NB-PRS\_rep}$ indicates the number of times that a predetermined period composed of L subframes is repeated within a single NB-PRS period, as described with reference to FIGS. 17-21.

Also, k indicates the number of NB-PRS periods to which the bitmap having a length of $k*N_{NB-PRS\_rep}$ (for indicating muting) is applied.

In this instance, k may be fixed to a predetermined value. For example, k may be fixed to a value (k=1) corresponding to a single NB-PRS period. As another example, k may be fixed to a value (k=2) corresponding to two NB-PRS periods.

One of a plurality of values may be as k, by higher layer signaling such as RRC or the like. For example, k may be 1, 2, 4, or 8, which correspond to 1, 2, 4, or 8 NB-PRS periods, one of which may be indicated by higher layer signaling such as RRC or the like. As another example, k may be 2, 4, 8 or 16, which correspond to 2, 4, 8, or 16 NB-PRS periods, one of which may be indicated by higher layer signaling such as RRC or the like.

A pseudo-random sequence may be used to indicate whether to apply muting, which is determined based on a predetermined duration composed of L subframes.

The value of each sequence element of the pseudo-random sequence may be 0 or 1, and each sequence element may correspond to each predetermined period composed of L subframes. In this instance, when the length of the pseudo-random sequence is N, the number of sequence elements is N and each sequence element may have a value in the range of 0 to N−1, as an index value.

Muting is not applied to any of the $N_{NB-PRS}$ subframes in a predetermined duration composed of L subframes corresponding to a sequence element of "1" in the pseudo-random sequence. Muting is applied to all of the $N_{NB-PRS}$ subframes in a predetermined duration composed of L subframes corresponding to a sequence element of "0". Conversely, muting is not applied to any of the $N_{NB-PRS}$ subframes in a predetermined duration composed of L subframes corresponding to a sequence element of "0" in the pseudo-random sequence. Muting is applied to all of the $N_{NB-PRS}$ subframes in a predetermined duration composed of L subframes corresponding to a sequence element of "1".

In this instance, the pseudo-random sequence may be generated through a pseudo-random sequence generator, and the pseudo-random sequence generator may be initialized to $c_{init}$ at the start of each period, based on a predetermined period. In this instance, $c_{init}$ may be configured based on eNB (or cell)-specific information in order to minimize NB-PRS interference among eNBs (or cells).

A more specific example will be provided as follows. The pseudo-random sequence may be a pseudo-random sequence which is defined as a length-31 gold sequence, and may be expressed as c(i). Here, c(i) may be 0 or 1, which indicates that an $i^{th}$ sequence element, counted from a $0^{th}$ sequence, has a value of "0" or "1". In this instance, i={0, 1, . . . , $N_{NB-PRS\_rep}$−1}. Also, the pseudo-random sequence generator for the pseudo-random sequence may be initialized to $c_{init}$ at the start of each NB-PRS period. In this instance, by taking into account that 6 patterns in a single NB-PRS transmission period are determined to be different by calculating a physical cell ID (PCID) modulo 6, $c_{init}$ may be configured based on an integer value obtained by dividing a PCID by 6 as shown in Equation 13.

$$c_{init} = \left\lfloor \frac{N_{ID}^{cell}}{6} \right\rfloor \quad \text{[Equation 13]}$$

Figure 23:
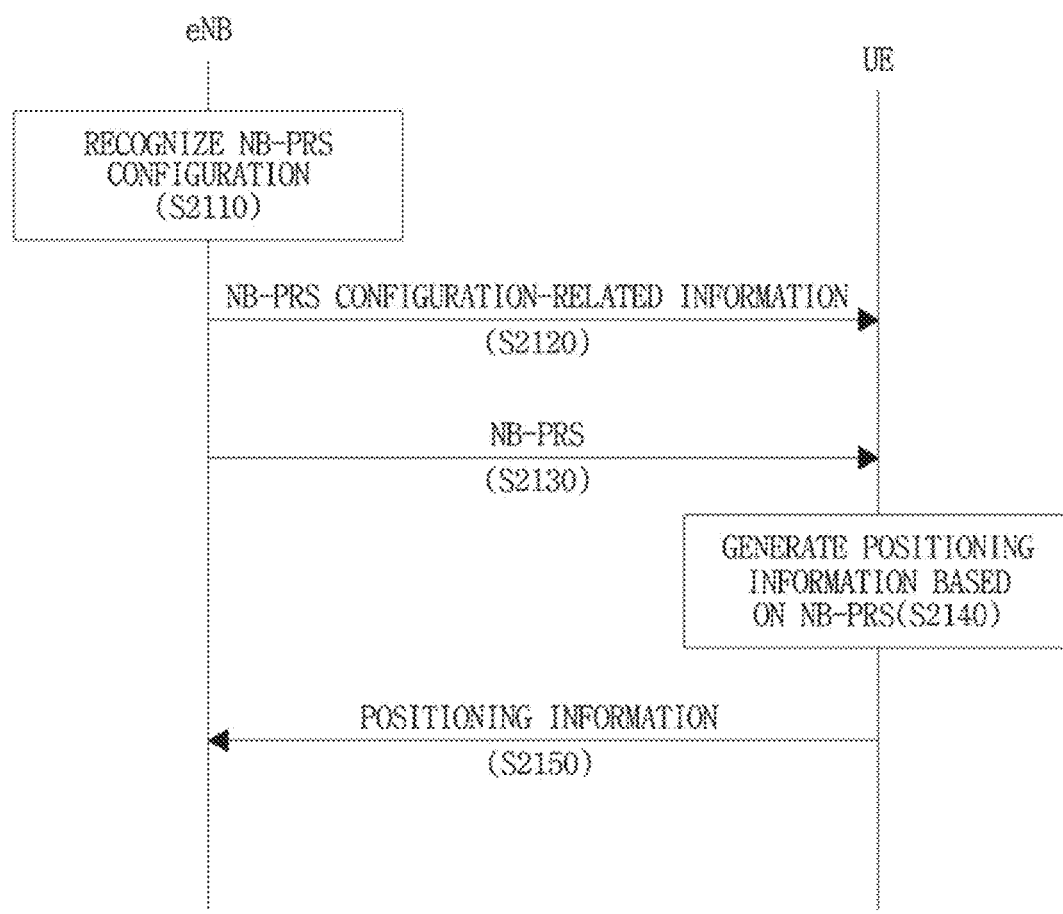
FIG. 23 is a flowchart illustrating NB-PRS transmission and reception operations.

FIG. 23 is a flowchart illustrating NB-PRS transmission and reception operations according to the present invention.

In operation S2310, an eNB may recognize an NB-PRS configuration of an NB-PRS to be transmitted to a UE. In this instance, the NB-PRS configuration of an NB-PRS to be transmitted from each eNB to a UE may be determined by a location server as shown in FIG. 11, and each eNB may receive an indication from the location server. As described in the examples of the present invention, the NB-PRS configuration may include one or more of an RE pattern in an NB-PRS transmission subframe, an NB-PRS sequence, an NB-PRS transmission PRB configuration, and an NB-PRS transmission subframe configuration.

In operation S2320, the eNB transmits NB-PRS configuration-related information to the UE. The NB-PRS configuration-related information may be indicated to each eNB through higher layer signaling (e.g., LPP layer signaling from the location server), and the eNB may then provide the same to the UE. The NB-PRS configuration-related information may include information associated with the NB-PRS transmission subframe configuration. The information associated with the NB-PRS transmission subframe configuration may include one or more of: an NB-PRS offset; an NB-PRS period; a value $N_{NB-PRS}$ that indicates the number of NB-PRS transmission subframes; information indicating a predetermined subframe (e.g., an NB-PRS non-transmission subframe) in which an NB-PRS is not transmitted; a bitmap indicating NB-PRS transmission subframes; a value L which indicates the number of subframes that form a predetermined duration in an NB-PRS period; and a value $N_{NB-PRS\_rep}$ that indicates the number of times a predetermined duration composed of L subframes is repeated. Also, previously determined values are used for some of the information associated with the NB-PRS transmission subframe configuration. In this instance, it is determined that a UE is already aware of the values without separate signaling. Detailed descriptions of each piece of information, which have already been included referring to the examples in FIGS. 14-21, will be omitted.

In operation S2330, the eNB transmits an NB-PRS to the UE. The UE may recognize one or more of the RE pattern in an NB-PRS transmission subframe, the NB-PRS sequence, the NB-RS transmission PRB configuration, and the NB-PRS transmission subframe configuration based on the NB-PRS configuration information received in operation S2320. The UE may then attempt to receive an NB-PRS based on this recognition.

In operation S2340, the UE generates positioning information (e.g., information such as RSTD, which is used for determining the location of the UE itself), using the NB-PRS received from the eNB and NB-PRSs received from other eNBs.

In operation S2350, the UE transmits the positioning information generated in operation S2340 to the eNB or to an NB-IoT server (or location server) via the eNB.

Although the above described illustrative methods are expressed as a series of operations for ease of description, they do not limit the order of operations executed; the operations may also be executed in parallel or in a different order. In addition, all of the operations described above may not always be required to implement the method of the present invention.

The embodiments described above include examples of various aspects of the present invention. Although it is difficult to describe all the possible combinations showing the various aspects, it is apparent to those skilled in the art that other combinations are possible. Therefore, it should be construed that the present invention includes other substitutions, corrections, and modifications belonging within the scope of claims.

The scope of the present invention may include an apparatus for processing or implementing the operations according to various embodiments of the present invention.

In one or more embodiments, an NB UE processes a positioning reference signal. The NB UE receives NB positioning reference signal (PRS) configuration information configured for the NB UE, the NB PRS configuration information comprising an NB PRS bitmap indicating a pattern selecting NB PRS subframes. Each NB PRS subframe comprises an NB PRS for positioning the NB UE. The NB UE determines, based on the NB PRS bitmap, a first NB PRS mapped in NB PRS subframes of an NB PRS reference cell, determines, based on the NB PRS bitmap, a second NB PRS mapped in NB PRS subframes of an NB PRS neighbor cell. The NB UE generates, based on the first NB PRS and the second NB PRS, a reference signal time difference (RSTD) measurement, and transmits the RSTD measurement.

The NB PRS bitmap may have a size of 10 consecutive bits respectively corresponding to 10 subframes in each radio frame. The NB UE may determine, from a plurality of radio frames of the NB PRS reference cell and based on a plurality of repetitions of the NB PRS bitmap, the NB PRS subframes of the NB PRS reference cell.

The NB UE may determine, from a plurality of radio frames of the NB PRS neighbor cell and based on a plurality of repetitions of the NB PRS bitmap, the NB PRS subframes of the NB PRS neighbor cell. The NB UE may determine, based on value '1' assigned to n-th bit of the NB PRS bitmap, n-th subframe of a radio frame as one NB PRS subframe.

The NB UE may calculate, based on a receipt time difference between the first NB PRS and the second NB PRS, a first RSTD. The NB UE may determine a third NB PRS mapped in NB PRS subframes of a second NB PRS neighbor cell, and calculate, based on a receipt time difference between the first NB PRS and the third NB PRS, a second RSTD. The NB UE may generate, based on the first RSTD and the second RSTD, the RSTD measurement.

The NB UE may receive a physical resource block (PRB) index indicating one PRB, and determine a frequency band corresponding to the one PRB and assigned to the NB UE. The first NB PRS and the second NB PRS are mapped in the frequency band.

The NB UE may receive an NB PRS muting indicator. The NB PRS muting indicator has a size of k consecutive bits respectively corresponding to k consecutive radio frames, where k is an integer selected from 2, 4, 8, or 16. The NB PRS bitmap may have a size of 10 consecutive bits respectively corresponding to 10 subframes in each radio frame.

The NB UE may determine, based on a value of n-th bit of the NB PRS muting indicator, whether NB PRS subframes in n-th radio frame of the k consecutive radio frames are muted.

In one or more embodiments, a network including a base station may process a positioning reference signal. The network may determine a narrow-band (NB) positioning reference signal (PRS) bitmap indicating a pattern selecting NB PRS subframes. Each NB PRS subframe comprises an NB PRS for positioning an NB user equipment (UE). The network transmits, to the NB UE, NB PRS configuration information for the NB UE, the NB PRS configuration information comprising the NB PRS bitmap. A reference cell (e.g., an NB PRS reference cell) determines, based on the NB PRS bitmap, NB PRS subframes of the reference cell, and map a first NB PRS in the NB PRS subframes of the reference cell. The reference cell receives, from the NB UE and in response to the first NB PRS, a reference signal time difference (RSTD) measurement.

A neighbor cell (e.g., an NB PRS neighbor cell) may determine, based on the NB PRS bitmap, NB PRS subframes of the neighbor cell, and map a nd NB PRS in the NB PRS subframes of the neighbor cell. The RSTD measurement is further based on the second NB PRS.

The NB PRS bitmap may have a size of 10 consecutive bits respectively corresponding to 10 subframes in each radio frame.

The reference cell may determine, from a plurality of radio frames of the reference cell and based on a plurality of repetitions of the NB PRS bitmap, the NB PRS subframes of the reference cell. The network may assign value '1' to n-th bit of the NB PRS bitmap to designate n-th subframe of a radio frame as one NB PRS subframe.

The network may transmit, to the NB UE, an NB PRS muting indicator. The NB PRS muting indicator may have a size of k consecutive bits respectively corresponding to k consecutive radio frames, and may select an integer value for k from 2, 4, 8, or 16. The reference cell and one or more neighbor cells may mute, based on a value of n-th bit of the NB PRS muting indicator, NB PRS subframes in n-th radio frame of the k consecutive radio frames.

Figure 24:
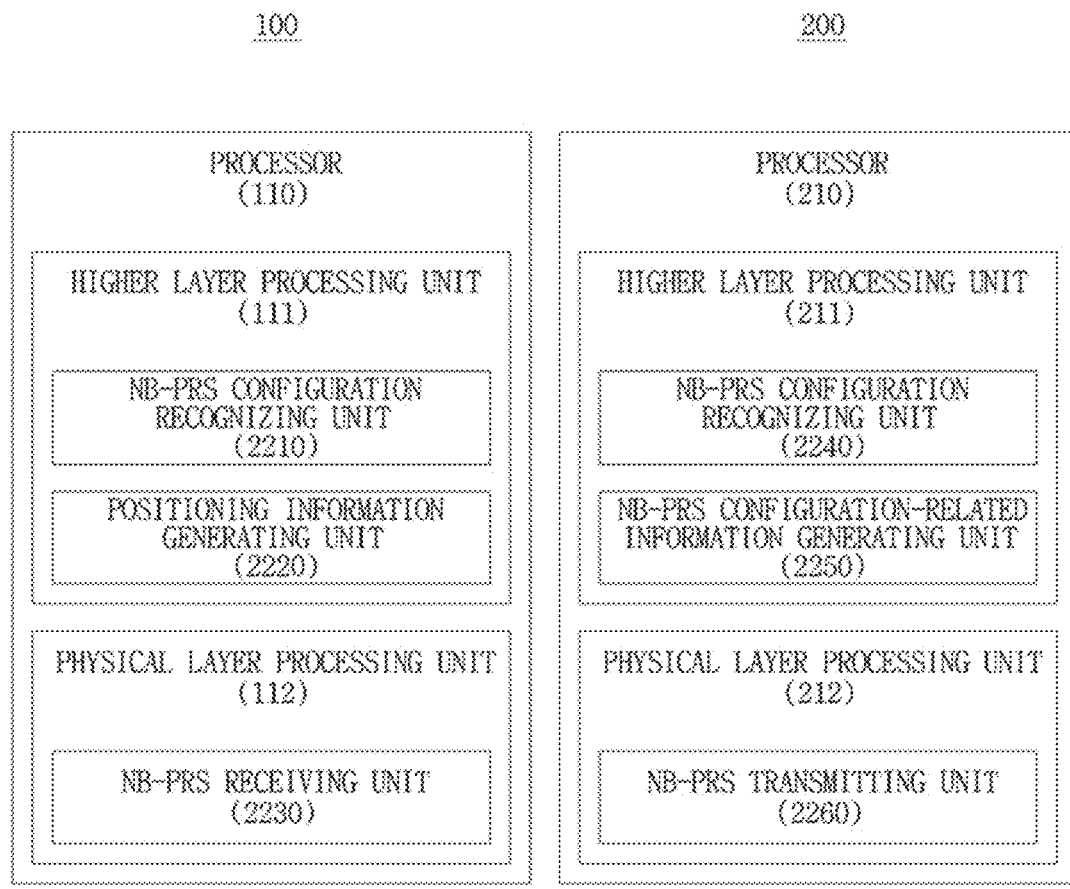
FIG. 24 is a diagram illustrating the configuration of a processor of a wireless device.

FIG. 24 is a diagram illustrating the configuration of a processor of a wireless device according to the present invention.

The processor 210 of the eNB 200 may be configured to implement the operations of the eNB, which have been described for all of the embodiments of the present invention.

For example, the higher layer processing unit 211 of the processor 210 of the eNB 200 may include an NB-PRS configuration recognizing unit 2440 and an NB-PRS configuration-related information generating unit 2450. The eNB may recognize the NB-PRS configuration of an NB-PRS to be transmitted to a UE through the NB-PRS configuration recognizing unit 2440. In this instance, the NB-PRS configuration of an NB-PRS to be transmitted from each eNB to a UE may be determined by a location server as shown in FIG. 11, and each eNB may receive an indication from the location server. As described in the examples of the present invention, the NB-PRS configuration may include one or more of an RE pattern in an NB-PRS transmission subframe, an NB-PRS sequence, an NB-PRS transmission PRB configuration, and an NB-PRS transmission subframe configuration. The eNB may generate information related to the NB-PRS configuration of an NB-PRS to be transmitted to the UE, through the NB-PRS configuration-related information generating unit 2450. The NB-PRS configuration-related information may be indicated to each eNB through higher layer signaling (e.g., LPP layer signaling from the location server), and the eNB may generate the information to be transmitted to the UE based on the indication information. The NB-PRS configuration-related information may include information associated with the NB-PRS transmission subframe configuration. The information associated with the NB-PRS transmission subframe configuration may include one or more of: an NB-PRS offset; an NB-PRS period; a value $N_{NB\text{-}PRS}$ which indicates the number of NB-PRS transmission subframes; information indicating a predetermined subframe (e.g., an NB-PRS non-transmission subframe) in which an NB-PRS is not transmitted; a bitmap indicating NB-PRS transmission subframes, a value L which indicates the number of subframes that form a predetermined duration in an NB-PRS period, and a value $N_{NB\text{-}PRS\_rep}$ which indicates the number of times that a predetermined duration composed of L subframes is repeated.

The physical layer processing unit 212 of the processor 210 of the eNB 200 may include an NB-PRS transmitting unit 2460. The NB-PRS transmitting unit 2460 may map an NB-PRS onto a physical resource according to the NB-PRS configuration, and may transmit the same to the UE 100.

The processor 110 of the UE 100 may be configured to implement the operations of the UE, which have been described in all of the embodiments of the present invention.

For example, the higher layer processing unit 111 of the processor 111 of the UE 100 may include an NB-PRS configuration recognizing unit 2410 and a positioning information generating unit 2420. The physical layer processing unit 112 of the processor 110 of the UE 100 may include an NB-PRS receiving unit 2430.

Based on the NB-PRS configuration-related information provided from the eNB 200, the NB-PRS configuration recognizing unit 2410 may recognize one or more configurations of: an RE pattern in an NB-PRS transmission subframe, an NB-PRS sequence, an NB-PRS transmission PRB configuration, and an NB-PRS transmission subframe configuration.

The NB-PRS receiving unit 2430 may receive an NB-PRS in a physical resource based on the determined NB-PRS configuration.

The positioning information generating unit 2420 may generate positioning information based on the received NB-PRS, and may transmit the same to an eNB or a network-side server through the physical layer processing unit 112.

What is claimed is:

1. A narrow-band (NB) user equipment (UE) comprising:
   a transceiver to receive NB positioning reference signal (PRS) configuration information configured for the NB UE, the NB PRS configuration information comprising:
   an NB PRS bitmap indicating a pattern selecting NB PRS subframes, wherein each NB PRS subframe comprises an NB PRS for positioning the NB UE; and
   a processor to determine, based on the NB PRS bitmap, a first NB PRS mapped in NB PRS subframes of an NB PRS reference cell, to determine, based on the NB PRS bitmap, a second NB PRS mapped in NB PRS subframes of an NB PRS neighbor cell, and to generate, based on the first NB PRS and the second NB PRS, a reference signal time difference (RSTD) measurement,
   wherein the transceiver transmits the RSTD measurement.

2. The NB UE of claim 1, wherein the NB PRS bitmap has a size of 10 consecutive bits respectively corresponding to 10 subframes in each radio frame.

3. The NB UE of claim 2, wherein the processor is configured to determine, from a plurality of radio frames of the NB PRS reference cell and based on a plurality of repetitions of the NB PRS bitmap, the NB PRS subframes of the NB PRS reference cell.

4. The NB UE of claim 2, wherein the processor is configured to determine, from a plurality of radio frames of the NB PRS neighbor cell and based on a plurality of repetitions of the NB PRS bitmap, the NB PRS subframes of the NB PRS neighbor cell.

5. The NB UE of claim 2, wherein the processor is configured to determine, based on value '1' assigned to n-th bit of the NB PRS bitmap, n-th subframe of a radio frame as one NB PRS subframe.

6. The NB UE of claim 1, wherein the processor is configured to calculate, based on a receipt time difference between the first NB PRS and the second NB PRS, a first RSTD.

7. The NB UE of claim 6, wherein the processor is configured to:
   determine a third NB PRS mapped in NB PRS subframes of a second NB PRS neighbor cell; and
   calculate, based on a receipt time difference between the first NB PRS and the third NB PRS, a second RSTD.

8. The NB UE of claim 7, wherein the generating the RSTD measurement comprises:
   generating, based on the first RSTD and the second RSTD, the RSTD measurement.

9. The NB UE of claim 1, wherein:
   the transceiver receives a physical resource block (PRB) index indicating one PRB; and
   the processor is configured to determine a frequency band corresponding to the one PRB and assigned to the NB UE, wherein the first NB PRS and the second NB PRS are mapped in the frequency band.

10. The NB UE of claim 1, wherein the transceiver receives an NB PRS muting indicator,
    wherein the NB PRS bitmap has a size of 10 consecutive bits respectively corresponding to 10 subframes in each radio frame, and
    wherein the NB PRS muting indicator has a size of k consecutive bits respectively corresponding to k consecutive radio frames, where k is an integer selected from 2, 4, 8, or 16.

11. The NB UE of claim 10, wherein the processor is configured to determine, based on a value of n-th bit of the NB PRS muting indicator, whether NB PRS subframes in n-th radio frame of the k consecutive radio frames are muted.

12. A system comprising:
    a processor to determine a narrow-band (NB) positioning reference signal (PRS) bitmap indicating a pattern selecting NB PRS subframes, wherein each NB PRS subframe comprises an NB PRS for positioning an NB user equipment (UE); and
    a transceiver to transmit, to the NB UE, NB PRS configuration information for the NB UE, the NB PRS configuration information comprising the NB PRS bitmap,
    wherein the processor is configured to determine, based on the NB PRS bitmap, NB PRS subframes of a reference cell, and to map a first NB PRS in the NB PRS subframes of the reference cell, and
    wherein the transceiver receives, from the NB UE and in response to the first NB PRS, a reference signal time difference (RSTD) measurement.

13. The system of claim 12, further comprising:
    one or more computing devices of a neighbor cell configured to:
    determine, based on the NB PRS bitmap, NB PRS subframes of the neighbor cell; and
    map a second NB PRS in the NB PRS subframes of the neighbor cell, wherein the RSTD measurement is further based on the second NB PRS.

14. The system of claim 12, wherein the NB PRS bitmap has a size of 10 consecutive bits respectively corresponding to 10 subframes in each radio frame.

15. The system of claim 14, wherein the processor is configured to determine, from a plurality of radio frames of the reference cell and based on a plurality of repetitions of the NB PRS bitmap, the NB PRS subframes of the reference cell.

16. The system of claim 14, wherein the processor is configured to assign value '1' to n-th bit of the NB PRS bitmap to designate n-th subframe of a radio frame as one NB PRS subframe.

17. The system of claim 14, wherein the transceiver transmits, to the NB UE, an NB PRS muting indicator, wherein the NB PRS muting indicator has a size of k consecutive bits respectively corresponding to k consecutive radio frames, where k is an integer selected from 2, 4, 8, or 16.

18. The system of claim 17, wherein the processor is configured to mute, based on a value of n-th bit of the NB PRS muting indicator, NB PRS subframes in n-th radio frame of the k consecutive radio frames.

* * * * *